(12) United States Patent
Xu

(10) Patent No.: US 12,495,285 B2
(45) Date of Patent: Dec. 9, 2025

(54) NFC CARD ACTIVATION METHOD AND APPARATUS

(71) Applicant: HONOR DEVICE CO., LTD., Shenzhen (CN)

(72) Inventor: Bo Xu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 29 days.

(21) Appl. No.: 18/252,215

(22) PCT Filed: Sep. 8, 2022

(86) PCT No.: PCT/CN2022/117730
§ 371 (c)(1),
(2) Date: May 9, 2023

(87) PCT Pub. No.: WO2023/077954
PCT Pub. Date: May 11, 2023

(65) Prior Publication Data
US 2024/0373200 A1 Nov. 7, 2024

(30) Foreign Application Priority Data
Nov. 8, 2021 (CN) .......................... 202111311498.X

(51) Int. Cl.
H04W 4/80 (2018.01)
(52) U.S. Cl.
CPC .................... H04W 4/80 (2018.02)

(58) Field of Classification Search
CPC ...................................................... H04W 4/80
See application file for complete search history.

(56) References Cited

U.S. PATENT DOCUMENTS 8,432,260 B2    4/2013  Talty et al.
9,820,016 B2 *  11/2017 Ljung ..................... H04W 4/80
2010/0045441 A1  2/2010 Hirsch et al.
(Continued)

FOREIGN PATENT DOCUMENTS

CN    102170299 A    8/2011
CN    103701506 A    4/2014
(Continued)

Primary Examiner — David Bilodeau
(74) Attorney, Agent, or Firm — Fish & Richardson P.C.

(57) ABSTRACT

This application provides an NFC card activation method and apparatus, applied to a first electronic device, where a Bluetooth function is enabled in the first electronic device, and the method comprises: detecting that a Bluetooth connection event occurs between Bluetooth identifiers of a second electronic device and the first electronic device; selecting a target Bluetooth identifier from the Bluetooth identifiers based on Bluetooth signal strength of the second electronic device; and activating NFC cards corresponding to the target Bluetooth identifier. Compared with geo-fence information, Bluetooth of a device is unique, so that a requirement of using the Bluetooth in multiple different places can be met. In addition, compared with positioning information, a Bluetooth signal is less susceptible to an environment. Therefore, the manner of activating an NFC card based on the Bluetooth connection has a wider application range.

20 Claims, 18 Drawing Sheets

(56) References Cited

U.S. PATENT DOCUMENTS

| | | | | |
|---|---|---|---|---|
| 2011/0210830 A1* | 9/2011 | Talty | ...................... | H04L 63/18 |
| | | | | 340/10.51 |
| 2015/0379624 A1* | 12/2015 | Poornachandran | ... | H04W 12/50 |
| | | | | 705/80 |
| 2017/0164192 A1* | 6/2017 | Schussmann | ....... | H04W 12/041 |
| 2018/0322376 A1* | 11/2018 | Henry | .................. | G06Q 10/087 |
| 2023/0106906 A1 | 4/2023 | Bian et al. | | |

FOREIGN PATENT DOCUMENTS

| | | |
|---|---|---|
| CN | 101536345 B | 3/2016 |
| CN | 109472908 A | 3/2019 |
| CN | 111385781 A | 7/2020 |
| CN | 111464987 A | 7/2020 |
| CN | 111651216 A | 9/2020 |
| CN | 112906409 A | 6/2021 |
| CN | 112989851 A | 6/2021 |
| CN | 113766478 A | 12/2021 |
| JP | 2015142384 A | 8/2015 |
| WO | 2016155179 A1 | 10/2016 |

\* cited by examiner

NFC CARD ACTIVATION METHOD AND APPARATUS

CROSS-REFERENCE TO RELATED APPLICATIONS

This application is a national stage of International Application No. PCT/CN2022/117730, filed on Sep. 8, 2022 which claims priority to Chinese Patent Application No. 202111311498. X, filed on Nov. 8, 2021. The disclosures of the aforementioned applications are hereby incorporated by reference in their entireties.

TECHNICAL FIELD

This application relates to the field of electronic information, and in particular, to a near field communication (Near Field Communication, NFC) card activation method and apparatus.

BACKGROUND

NFC is a short-range and high-frequency radio technology, and is widely applied to electronic devices. An electronic device automatically activates an NFC card, which can provide a user with a good experience.

Generally, the NFC card is determined and activated according to geo-fence information corresponding to the NFC card. However, this manner of activating an NFC card based on geo-fence information has a limited application range.

SUMMARY

This application provides an NFC card activation method and apparatus, to resolve the problem of the limited application range of the NFC card activation manner.

To achieve the foregoing purpose, this application provides the following technical solutions:

A first aspect of this application provides an NFC card activation method, applied to a first electronic device, where a Bluetooth function is enabled in the first electronic device, and the method includes: detecting that a Bluetooth connection event occurs between Bluetooth identifiers of a second electronic device and the first electronic device; selecting a target Bluetooth identifier from the Bluetooth identifiers based on Bluetooth signal strength of the second electronic device; and activating NFC cards corresponding to the target Bluetooth identifier. Compared with geo-fence information, Bluetooth of a device is unique, so that a requirement of using the Bluetooth in multiple different places can be met. In addition, compared with positioning information, a Bluetooth signal is less susceptible to an environment, and therefore has a wider application range.

Optionally, after the activating NFC cards corresponding to the target Bluetooth identifier, the method further includes: displaying the activated NFC cards to remind a user, which helps to improve usage experience of the user.

Optionally, the NFC cards corresponding to the target Bluetooth identifier include: a first NFC card and a second NFC card. The first NFC card is used for the second electronic device, and the second NFC card is used for an associated apparatus of the second electronic device. The Bluetooth identifiers correspond to multiple NFC cards, which can not only implement NFC control on the second electronic device, but also implement NFC control on an association of the second electronic device, thereby being applicable to more scenarios.

Optionally, the activating NFC cards corresponding to the target Bluetooth identifier includes: activating the first NFC card to preferentially implement the NFC control on the second electronic device.

Optionally, an activation basis of the first NFC card is the Bluetooth connection event, and an activation basis of the second NFC card is a geo-fence. The activating NFC cards corresponding to the target Bluetooth identifier includes: activating the NFC cards corresponding to the target Bluetooth identifier based on an activation priority in response to the first electronic device being in the geo-fence of the second NFC card, where the activation priority indicates a priority of the activation bases. That is, when the first electronic device is both in the geo-fence of the second NFC card and in a Bluetooth connection with the second electronic device, the NFC cards can be sequentially activated provided that the activation priority is pre-configured. Therefore, the user can configure the activation priority as required and implement automatic activation of the NFC cards in multiple scenarios.

Optionally, the activation priority is configured based on data in the first electronic device. The data in the electronic device can reflect a current scenario that the user is in, so that the activation priority matches the current scenario more, and further an activation sequence of the NFC cards meets a usage requirement of the user more.

Optionally, the activating NFC cards corresponding to the target Bluetooth identifier includes: activating the NFC cards corresponding to the target Bluetooth identifier based on an activation sequence. The activation sequence may be pre-configured, which can not only match multiple scenarios flexibly, but also be applicable to a scenario in which a positioning signal is relatively weak.

Optionally, the activation sequence is configured based on data in the first electronic device, so that the activation priority matches the current scenario more, and further the activation sequence of the NFC cards meets a usage requirement of the user more.

Optionally, the target Bluetooth identifier belongs to multiple correspondences, where the multiple correspondences all include a correspondence among the target Bluetooth identifier, the first NFC card, and other NFC cards. The other NFC cards in different correspondences are different, the first NFC card is used for the second electronic device, and the other NFC cards are used for an associated apparatus of the second electronic device. The activating NFC cards corresponding to the target Bluetooth identifier includes: activating the NFC cards corresponding to the target Bluetooth identifier in a target correspondence, where the target correspondence is a correspondence selected from the multiple correspondences. Multiple correspondences are configured for one Bluetooth identifier, and the same Bluetooth identifier may correspond to different other NFC cards, so that the application range can be further expanded.

Optionally, the method in the first aspect further includes: detecting that a Bluetooth disconnection event occurs between the Bluetooth identifiers of the second electronic device and the first electronic device; activating NFC cards in response to a first condition, where the first condition includes: the activated NFC cards are NFC cards corresponding to the Bluetooth identifiers on which the Bluetooth disconnection event occurs, to ensure that it is applicable to other mechanisms for activating the NFC cards.

Optionally, the activating NFC cards includes: activating the NFC cards based on geo-fence information, to ensure compatibility with a geo-fence activation mechanism; or activating the NFC cards corresponding to the Bluetooth identifiers on which the Bluetooth disconnection event occurs. Therefore, in a case that a positioning signal is relatively weak, provided that a correspondence of NFC cards that need to be used is pre-configured after the Bluetooth identifiers are disconnected from Bluetooth, the NFC cards can be used after the Bluetooth disconnection, so that it is applicable to more scenarios.

Optionally, the first condition further includes: there is no Bluetooth identifier that is connected to the first electronic device in pre-configured Bluetooth identifiers, to ensure that the NFC cards are activated preferentially through a Bluetooth connection.

Optionally, a configuration method of the Bluetooth identifiers of the second electronic device and the corresponding NFC cards includes: configuring the Bluetooth identifiers for the NFC cards based on a display interface of the NFC cards; or configuring the NFC cards for the Bluetooth identifiers based on a display interface of the Bluetooth identifiers, thereby providing a configuration manner that is easy and more flexible for the user.

A second aspect of this application provides an electronic device, including: a processor and a memory, where the memory is configured to store an application, and the processor is configured to run the application to implement the NFC card activation method provided in the first aspect of this application.

A third aspect of this application provides a computer-readable storage medium, storing a program, where the program, when run by a computer device, implements the NFC card activation method provided in the first aspect of this application.

DESCRIPTION OF EMBODIMENTS

Figure 1:
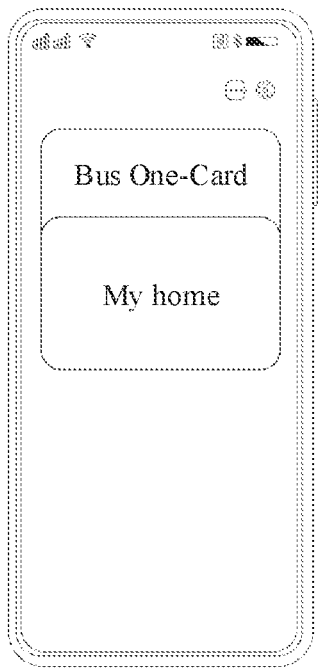
FIG. 1 is an exemplary diagram of a display interface of an NFC card configured in a mobile phone.
Figure 2:
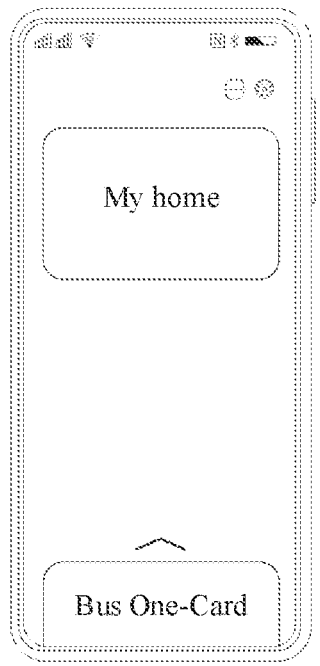
FIG. 2 is an exemplary diagram of an NFC card configured in a mobile phone being activated.

FIG. 1 shows a display interface of an NFC card configured in a mobile phone. In FIG. 1, a bus card (whose name is displayed as "Bus One-Card") and an access card (whose name is displayed as "My home") are used as examples of the NFC card. The access card is configured with a corresponding geo-fence. After the mobile phone enters the geo-fence, provided that an NFC function of the mobile phone is enabled, the access card is activated regardless of whether the NFC card is displayed. For example, if a user carries a mobile phone with an enabled NFC function and in a locked state, after the user carries the mobile phone into the geo-fence corresponding to the access card named "My home", the NFC card is activated. As shown in FIG. 2, when an NFC card list is displayed on the mobile phone, the NFC card named "My home" tops the NFC card list, indicating that the NFC card is in an activated state.

In this embodiment of this application, activation means that data interaction may occur once a matched NFC signal is detected in a signal detection state.

The manner of activating an NFC card based on a geo-fence is not applicable to the following scenarios:

1. The NFC card has a usage requirement in multiple different places, such as a bus NFC card or an NFC car key.

The NFC car key is used as an example. Since a car may need to be locked or unlocked almost at any place, the NFC car key cannot be configured with a geo-fence. Therefore, the NFC car key cannot be activated based on a geo-fence.

2. Strength of a positioning signal in some places is insufficient to obtain positioning information.

For example, geo-fence information cannot be obtained by an access control system underground due to a weak positioning signal. Therefore, the NFC card cannot be activated based on a geo-fence.

In conclusion, the manner of activating an NFC card based on a geo-fence has a limited application range.

To resolve the foregoing problem, an NFC card activation method disclosed in this application activates an NFC card based on a Bluetooth event, and has a wider application range. In the following embodiments, an NFC car key is used as an example for description.

In the following embodiments, the Bluetooth event includes a Bluetooth connection event and a Bluetooth disconnection event. The Bluetooth connection event refers to a data connection through Bluetooth. The Bluetooth disconnection event refers to a disconnection of a data connection through the Bluetooth.

In the following embodiments, the Bluetooth may be but is not limited to Bluetooth low energy (Bluetooth Low Energy, BLE), also referred to as Bluetooth 4.0, Bluetooth 3.0, and the like.

The NFC card activation method disclosed in this embodiment of this application is applied to an electronic device.

In some implementations, the electronic device may be a mobile phone, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), a wearable electronic device, a smart watch, or the like.

Figure 3:
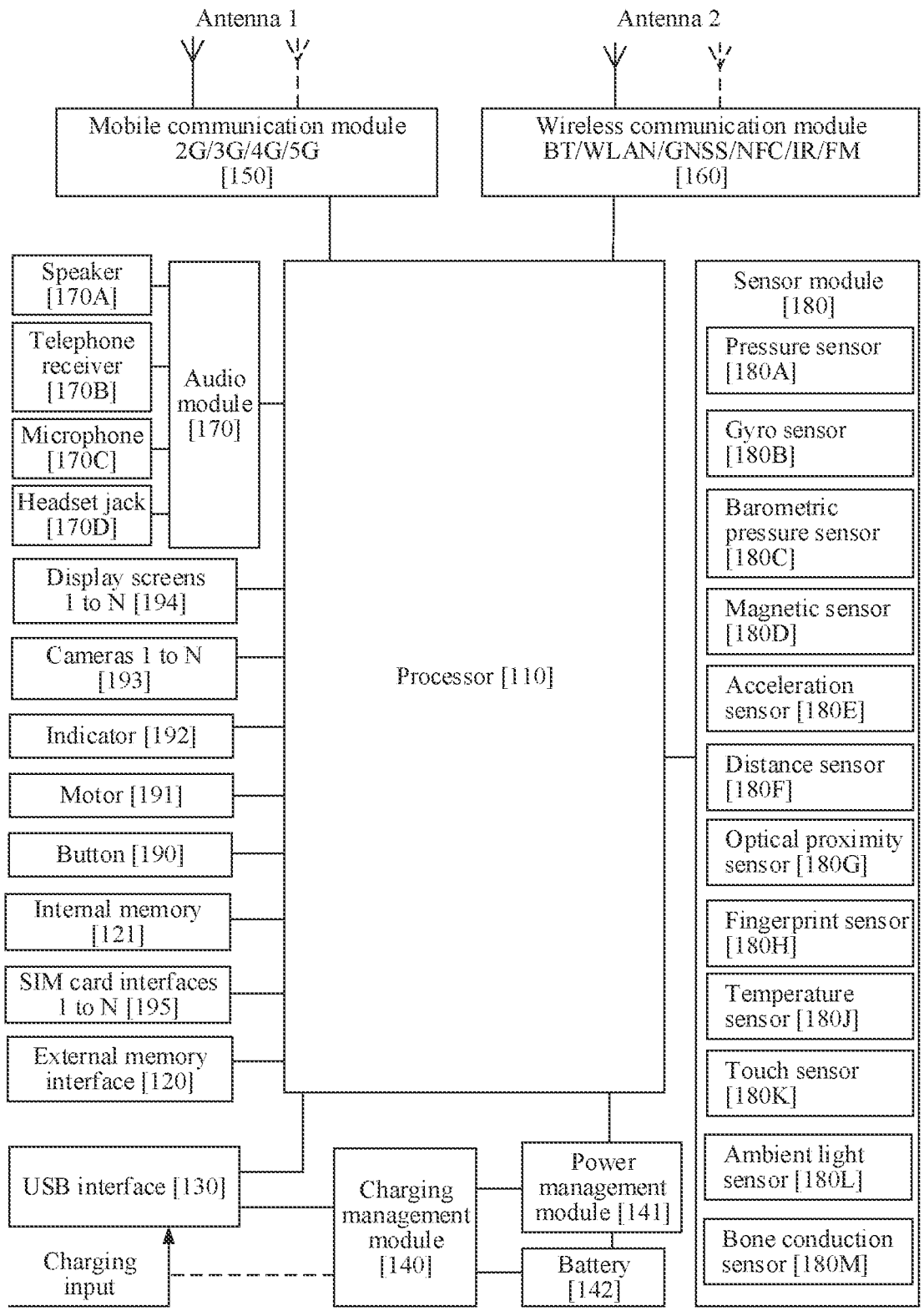
FIG. 3 is an exemplary structural diagram of an electronic device disclosed in an embodiment of this application.

An example that the electronic device is a mobile phone is used. FIG. 3 shows a partial structure of a mobile phone related to an embodiment of this application, including: a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a telephone receiver 170B, a microphone 170C, a headset jack 170D, a sensor module 180, a button 190, a motor 191, an indicator 192, a camera 193, a display screen 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not constitute a specific limitation on the electronic device. In some other embodiments, the electronic device may include more or fewer components than those shown in the figure, or some components may be combined, or some components may be split, or a different component deployment may be used. The components shown in the figure may be implemented by hardware, software, or a combination of software and hardware.

The processor 110 may include one or more processing units. For example: the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device. The controller may generate an operation control signal according to an instruction operation code and a time-sequence signal, and control obtaining and executing of instructions.

A memory may also be disposed in the processor 110, configured to store instructions and data. In some embodiments, the memory in the processor 110 is a cache memory. The memory may store an instruction or data that is just used or cyclically used by the processor 110. If the processor 110 needs to use the instruction or the data again, the instruction or the data may be invoked directly from the memory, to avoid repeated access and reduce waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface.

The MIPI interface may be used for connecting the processor 110 to a peripheral device such as the display screen 194 or the camera 193. The MIPI interface includes a camera serial interface (camera serial interface, CSI), a display serial interface (display serial interface, DSI), and the like. In some embodiments, the processor 110 communicates with the display screen 194 through the DSI interface, to implement a display function of the electronic device.

The GPIO interface may be configured through software. The GPIO interface may be configured as a control signal, or may be configured as a data signal. In some embodiments, the GPIO interface may be used for connecting the processor 110 to the camera 193, the display screen 194, the wireless communication module 160, the audio module 170, the sensor module 180, and the like.

The UART interface is a universal serial data bus for asynchronous communication. The bus may be a two-way communication bus. The bus converts to-be-transmitted data between serial communication and parallel communication. In some embodiments, the UART interface is usually used for connecting the processor 110 to the wireless communication module 160. For example: the processor 110 communicates with a Bluetooth module in the wireless communication module 160 through the UART interface, to implement a Bluetooth function.

It may be understood that the interface connection relationship between the modules shown in this embodiment is merely an example for description, and constitutes no limitation on the structure of the electronic device. In some other embodiments of this application, the electronic device may alternatively use an interface connection manner different from that in the foregoing embodiment, or use a combination of multiple interface connection manners.

The wireless communication module 160 may provide a solution for wireless communication including a wireless local area network (wireless local area network, WLAN) (such as a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, and the like to be applied to the electronic device. The wireless communication module 160 may be one or more devices that integrate at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may alternatively receive a to-be-sent signal from the processor 110, perform frequency modulation and amplification on the to-be-sent signal, and convert the to-be-sent signal into an electromagnetic wave for radiation through the antenna 2.

The electronic device implements a display function through the GPU, the display screen 194, the application processor, and the like. The GPU is a microprocessor for image processing, and is connected to the display screen 194 and the application processor. The GPU is configured to perform mathematical and geometric calculation, and is configured to render graphics. The processor 110 may include one or more GPUs that execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Miniled, a MicroLed, a Micro-oLed, a quantum dot light emitting diode (quantum dot light emitting diode, QLED), or the like. In some embodiments, the electronic device 102 may include one or N display screens 194, where N is a positive integer greater than 1.

A series of graphical user interfaces (graphical user interface, GUIs) may be displayed on the display screen 194 of the electronic device, and these GUIs are all home screens of the electronic device. Generally, a size of the display screen 194 of the electronic device is fixed, and only a limited number of controls can be displayed on the display screen 194 of the electronic device. A control is a GUI element, which is a software component included in an application, and controls all data processed by the application and an interactive operation about the data. A user may interact with the control through a direct manipulation (direct manipulation) to read or edit related information of the application. Generally, the control may include visual interface elements such as an icon, a button, a menu, a tab, a text box, a dialog box, a status bar, a navigation bar, and a Widget. For example, in this embodiment of this application, the display screen 194 may display a pairing button of an NFC key and a Bluetooth identifier.

An operating system implemented by the processor 110 by running a program code may be an iOS operating system, an Android open source operating system, a Windows operating system, or the like.

Figure 4:
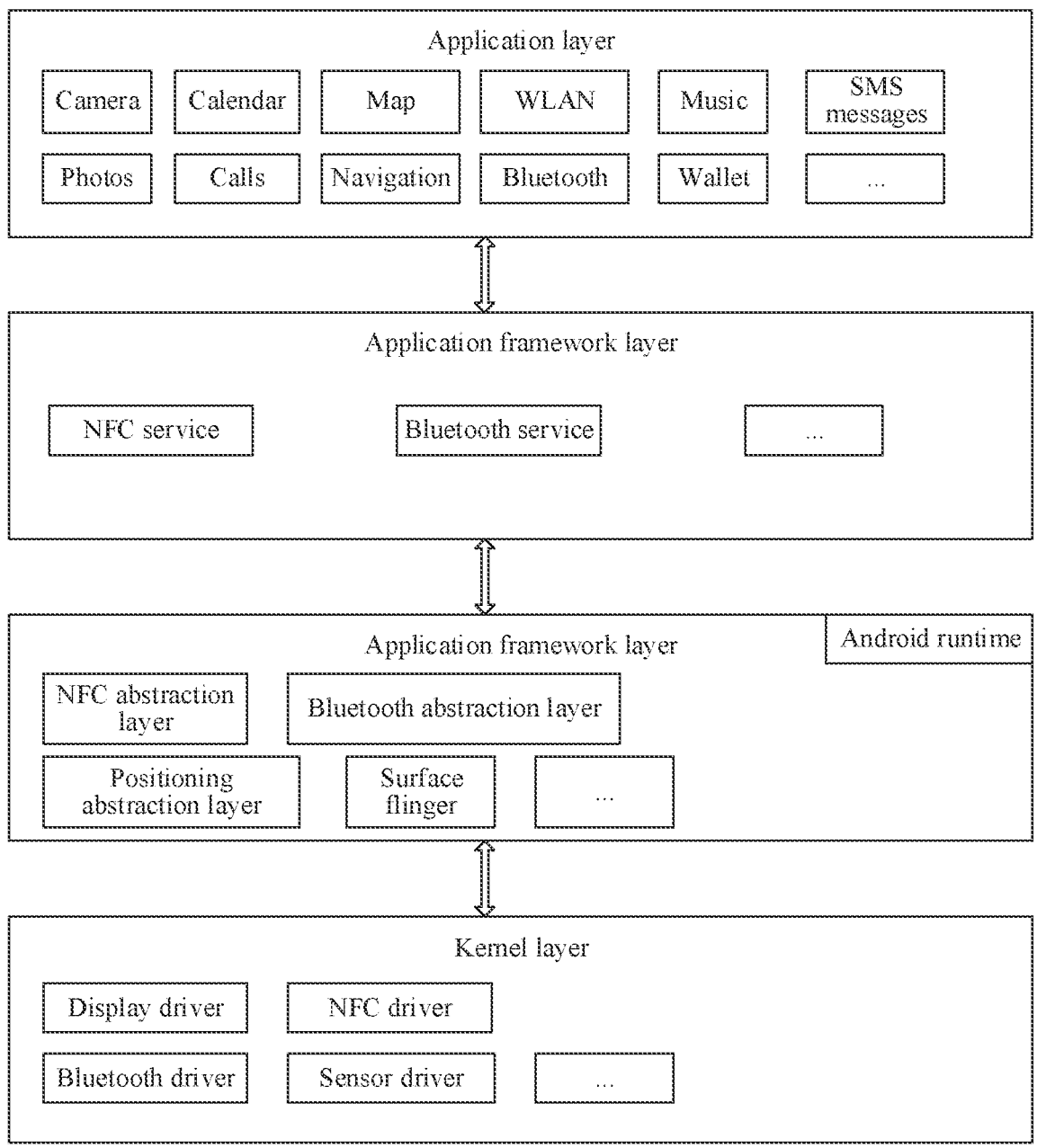
FIG. 4 is an exemplary diagram of a software framework running in an electronic device disclosed in an embodiment of this application.

The Android open source operating system is used as an example. As shown in FIG. 4, in some embodiments, an Android system is divided into four layers, which are an application layer, an application framework layer, a hardware abstraction layer, and a kernel layer from top to bottom.

The application layer may include a series of application packages (APPs). As shown in FIG. 4, the application packages may include applications such as camera, photos, calendar, calls, map, navigation, WLAN, Bluetooth, music, and SMS messages. In this embodiment of this application, the application packages may further include an application named wallet that is used for configuring and managing an NFC card.

The application framework layer provides an application programming interface (application programming interface, API) and a programming framework for the applications at the application layer. The application framework layer includes some predefined functions. As shown in FIG. 3, the application framework layer may include an NFC service and a Bluetooth service related to this embodiment of this application.

The hardware abstraction layer (HAL), or referred to as an Android runtime (Android runtime), is responsible for scheduling and management of an Android system; and includes a core library and a virtual machine.

The core library includes two parts: one part is a performance function that a Java language needs to invoke, and the other part is a core library of Android.

The application layer and the application framework layer are run in the virtual machine. The virtual machine executes java files of the application layer and the application framework layer as binary files. The virtual machine is used for performing functions such as object lifecycle management, stack management, thread management, security and exception management, and garbage collection.

A system library may include multiple functional modules, for example: an NFC abstraction layer, a Bluetooth abstraction layer, a positioning abstraction layer, and a surface flinger (surface engine). The NFC abstraction layer is used for reporting an NFC event to an upper-layer NFC service. The Bluetooth abstraction layer is used for reporting a Bluetooth event to an upper-layer Bluetooth service.

The kernel layer is a layer between hardware and software. In this embodiment of this application, the kernel layer includes at least a display driver, a Bluetooth driver, and an NFC driver. Each driver is used for processing obtained data of hardware and reporting a processing result to a corresponding module of the hardware abstraction layer.

Figure 5:
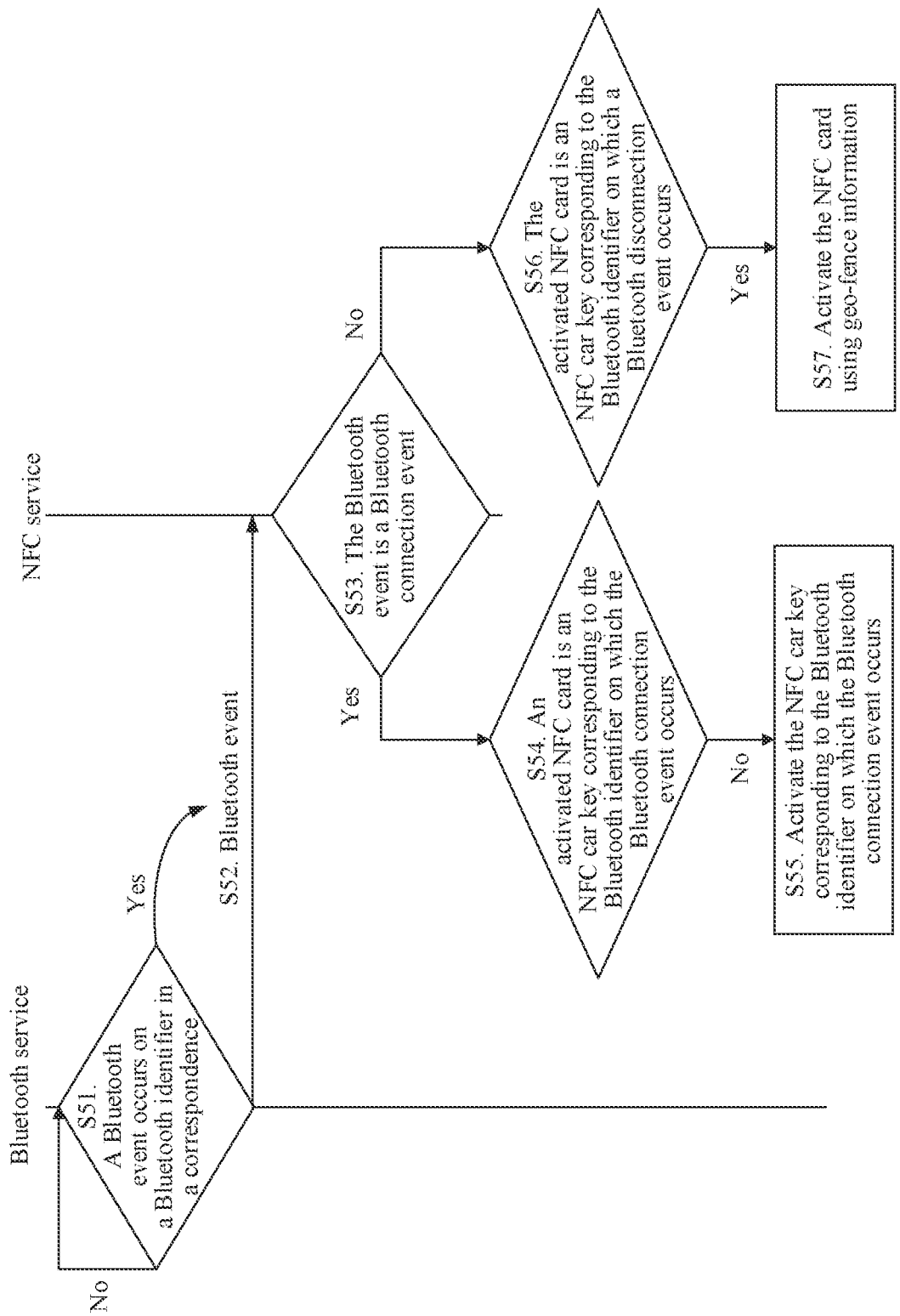
FIG. 5 is a flowchart of an NFC card activation method disclosed in an embodiment of this application.

FIG. 5 shows an NFC card activation method disclosed in an embodiment of this application, applied to the electronic device shown in FIG. 3 and implemented based on the framework shown in FIG. 4.

The method shown in FIG. 5 is applied to the following scenario examples:

A Bluetooth function of a mobile phone is enabled. An NFC function may or may not be enabled. In addition, a correspondence between information about an NFC car key and Bluetooth information of a car has been configured in the mobile phone.

It may be understood that, in any correspondence, the NFC car key can lock and unlock the car with the corresponding Bluetooth information.

An example of the correspondence is shown in Table 1:

TABLE 1

| Index | NFC car key | Bluetooth of car |
|-------|-------------|------------------|
| 0     | CarKeyId0   | CarBleId0        |

In Table 1, "Index" is the number of the correspondence, and each correspondence has a unique number. In this embodiment, a correspondence numbered 0 is used as an example. The column "NFC car key" is a unique identifier of the NFC car key, which is represented by "CarKeyId0". The column "Bluetooth of car" is a Bluetooth identifier of the car, which is represented by "CarBleId0". That is: Table 1 shows a pre-configured correspondence, representing a car that has a Bluetooth identifier "CarBleId0", and an identifier of the NFC car key is "CarKeyId0".

Figure 6A:
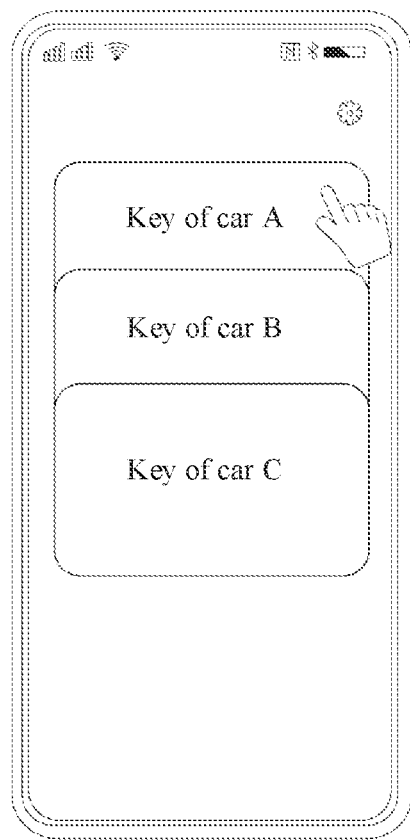
FIG. 6a to FIG. 6d are exemplary diagrams of configuring a correspondence from an interface of NFC car keys disclosed in an embodiment of this application.
Figure 6B:
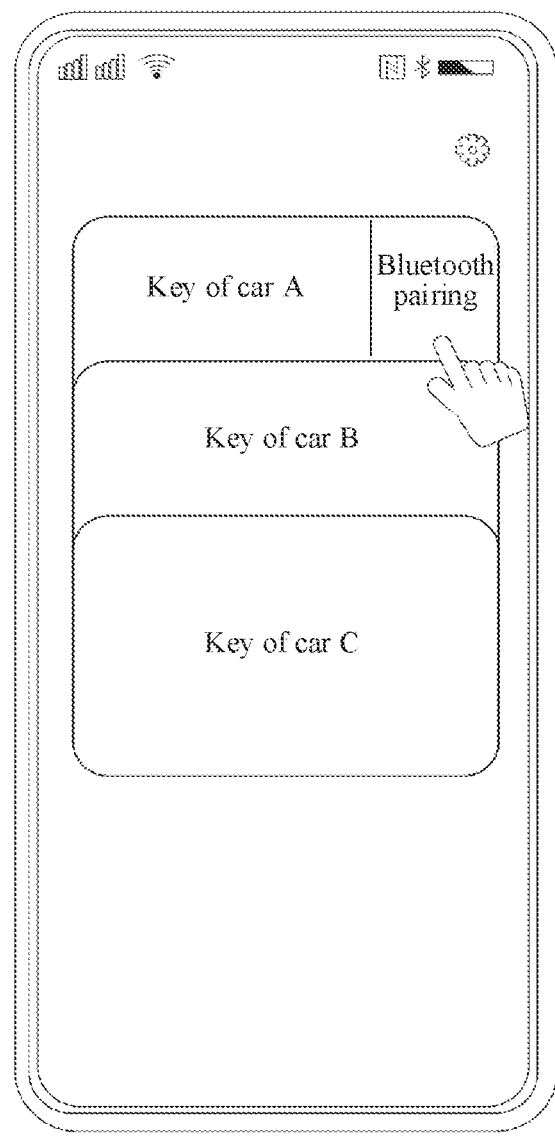
Figure 6D:
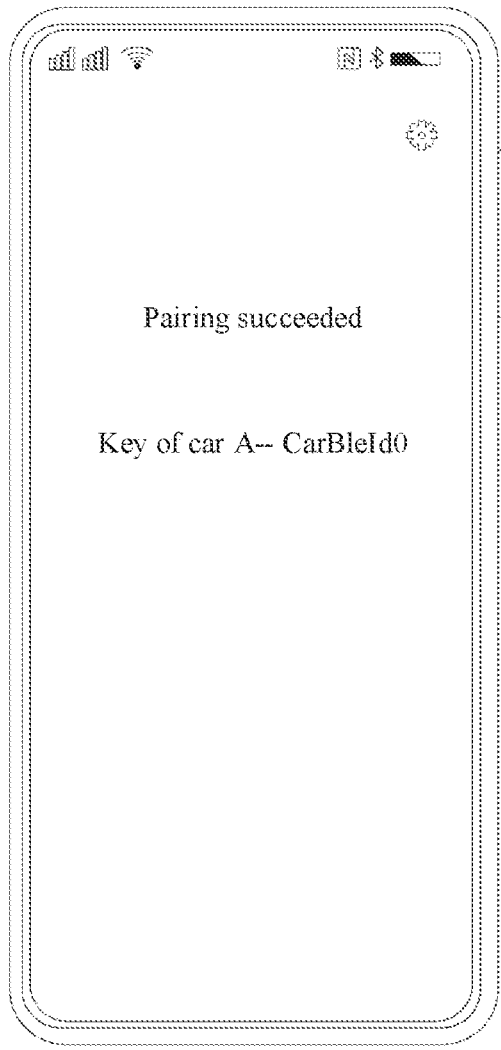
Figure 6C:
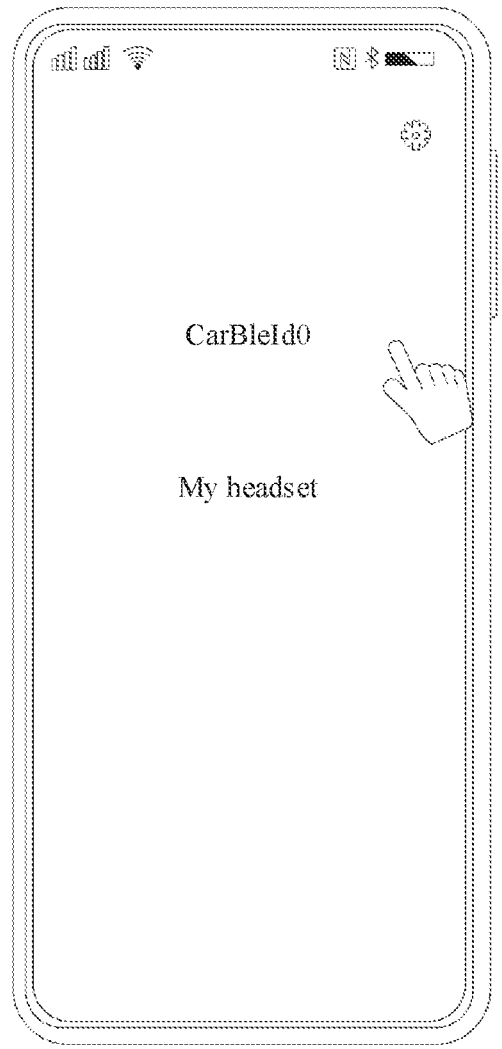

FIG. 6a to FIG. 6d show an example of configuring a correspondence from an interface of NFC car keys:

FIG. 6a shows a display interface of the NFC car keys. A user can operate any NFC car key, and the operation includes but is not limited to a slide and a tap. As shown in FIG. 6b, based on an operation of the user on "Key of car A", a control that adds a Bluetooth identifier of a car and whose name is displayed as "Bluetooth Pairing" is displayed on the interface. As shown in FIG. 6c, currently detected Bluetooth identifiers are displayed based on an operation on the control. A Bluetooth identifier "CarBleId0" selected by the user and an identifier of the NFC car key are correspondingly stored, and a correspondence is obtained. As shown in FIG. 6d, prompt information of successful pairing is displayed, which includes but is not limited to the identifier of the NFC car key and the Bluetooth identifier that are correspondingly stored.

It may be understood that the operation on the NFC car key and the operation on the control that adds a Bluetooth identifier of the car may be the same or different, which is not limited herein. For a pairing manner of an NFC car key and a physical car key, details are not described herein.

Figure 7A:
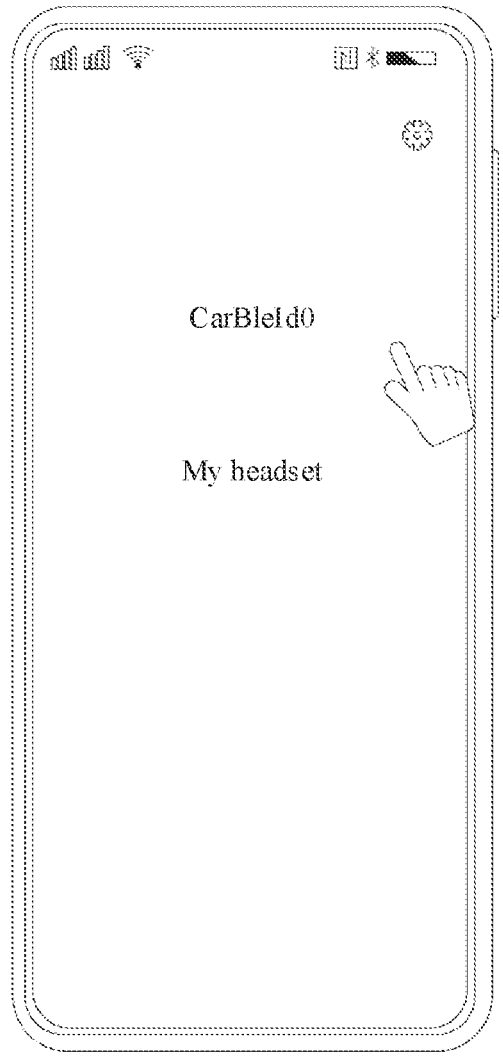
FIG. 7a to FIG. 7d are exemplary diagrams of configuring a correspondence from a Bluetooth interface disclosed in an embodiment of this application.
Figure 7B:
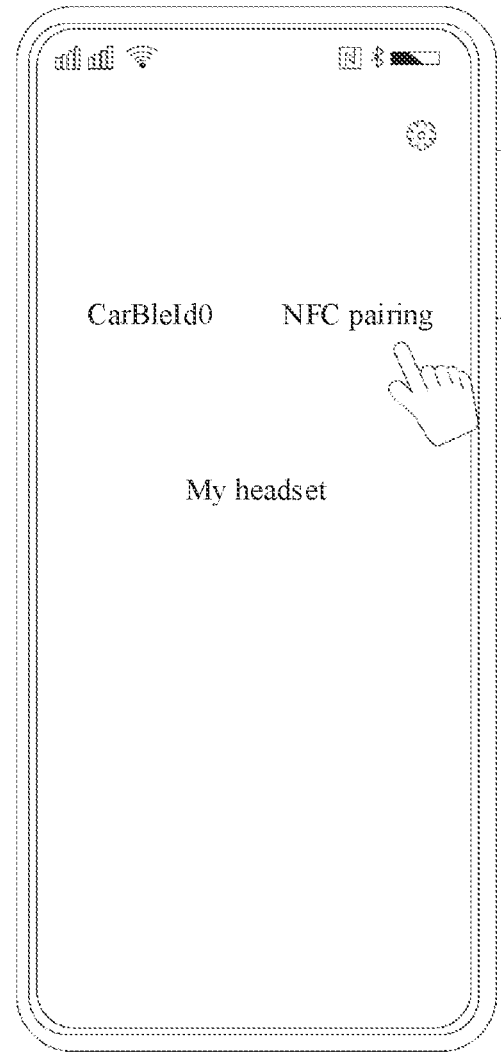
Figure 7D:
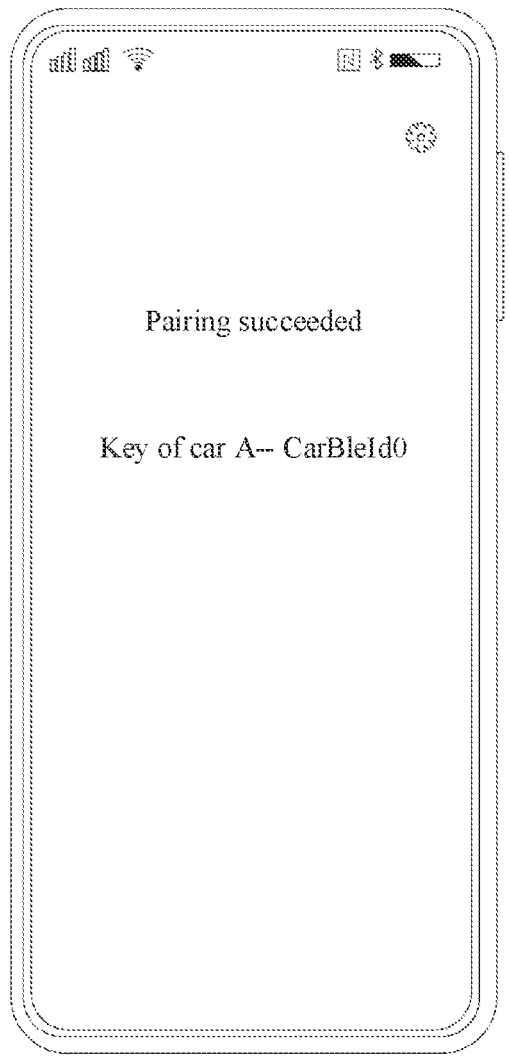
Figure 7C:
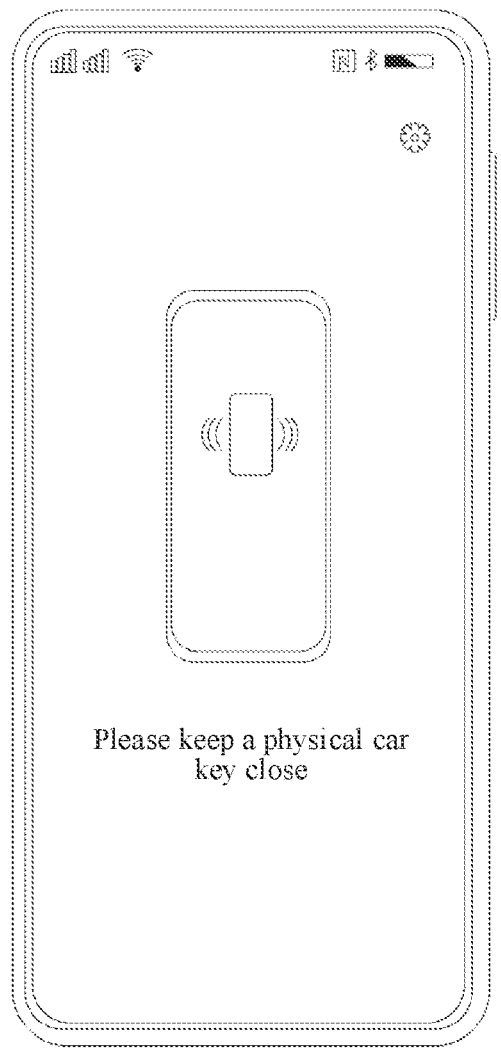

FIG. 7a to 7d show an example of configuring a correspondence from a display interface of Bluetooth identifiers:

FIG. 7a shows a list of currently detected Bluetooth identifiers and a user can operate any one of the Bluetooth identifiers. Based on an operation of the user on "CarKeyId0", as shown in FIG. 7b, a control that adds an NFC car key and whose name is displayed as "NFC Pairing" is displayed on the interface. An NFC pairing prompt shown in FIG. 7c is displayed based on an operation on the control. The user puts a physical car key close to a mobile phone, and after the mobile phone detects an NFC signal of the physical car key, a Bluetooth identifier CarKeyId0 and an identifier of the NFC car key are correspondingly stored. As shown in FIG. 7d, prompt information of successful pairing is displayed, which includes but is not limited to the identifier of the NFC car key and the Bluetooth identifier that are correspondingly stored.

It is assumed that the car of the user is a car a shown in FIG. 6a. When the user carries the mobile phone from being relatively far away from the car a to gradually approaching the car a, S51 to S54 are performed.

S51. A Bluetooth service detects whether a Bluetooth event occurs on a Bluetooth identifier in a pre-configured correspondence. If yes, S52 is performed, and if not, no processing is performed or S51 continues to be performed.

It may be understood that S51 may be performed using a preset cycle or in a preset trigger condition, for example, in S51 or S54, S51 is performed if a determining result is no. Alternatively, S51 is performed periodically and may be triggered by a trigger condition.

The correspondence includes: a correspondence between information about the NFC car key and Bluetooth information of the car. An example and a configuration manner are as described above.

The Bluetooth event includes a Bluetooth connection event and a Bluetooth disconnection event. For each Bluetooth identifier in the correspondence, whether a Bluetooth event occurs needs to be detected.

It may be understood that, based on a technical feature of Bluetooth, when the mobile phone is relatively far from the car a, the mobile phone is beyond a connection range of the Bluetooth of the car, and the mobile phone cannot be connected to the Bluetooth of the car a, so that the Bluetooth connection event cannot be detected. After a distance between the mobile phone and the car a is within the connection range of the Bluetooth, the mobile phone is connected to the Bluetooth of the car, so that the mobile phone can detect the Bluetooth connection event between the mobile phone and the car a.

S52. The Bluetooth service transmits a detected Bluetooth event to an NFC service.

Combined with the foregoing correspondence and the application examples, after detecting the Bluetooth connection event between the mobile phone and the car a, the Bluetooth service running in the mobile phone transmits the Bluetooth connection event of the Bluetooth identifier "CarBleId0" to the NFC service.

S53. The NFC service determines whether the Bluetooth event is a Bluetooth connection event. If yes, S54 is performed, and if not, S56 is performed.

S54. The NFC service determines whether an activated NFC card is the NFC car key corresponding to the Bluetooth identifier of the Bluetooth connection event. If yes, no processing is performed or S51 is performed again, and if not, S55 is performed.

With reference to the foregoing scenario examples, a target Bluetooth identifier is "CarBleId0".

It may be understood that the activated NFC card may be the NFC car key "CarKeyId0" corresponding to "CarBleId0". For example, the user has manually activated the NFC car key "CarKeyId0" in advance. In this case, it is acceptable to keep the NFC car key "CarKeyId0" activated. The activated NFC card may not be the NFC car key "CarKeyId0" corresponding to "CarBleId0". In this case, since the car a has been connected to the mobile phone through Bluetooth, it is very likely that the user expects to unlock the car a, and therefore S55 is performed.

S55. The NFC service activates the NFC car key corresponding to the Bluetooth identifier on which the Bluetooth connection event occurs.

It may be understood that, when an NFC function is not enabled, the NFC function may be enabled first, and then the NFC car key is activated.

With reference to the foregoing correspondence and application examples, the NFC car key "CarKeyId0" corresponding to the Bluetooth identifier "CarBleId0" is activated.

Figure 8:
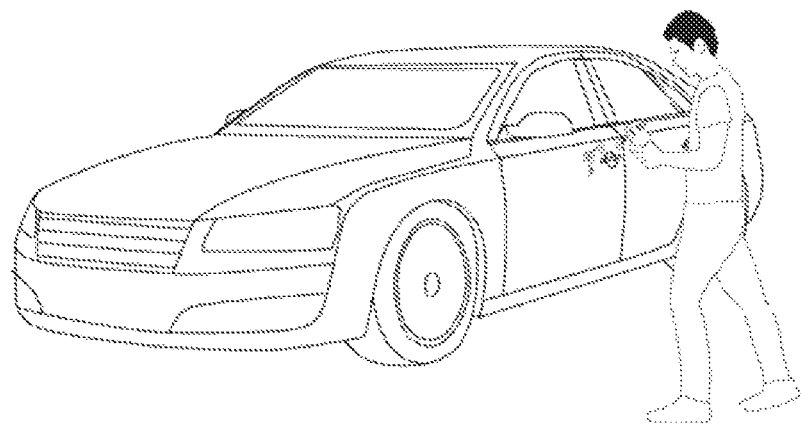
FIG. 8 is an exemplary diagram of unlocking a car door using an NFC card activation method disclosed in an embodiment of this application.

As shown in FIG. 8, after a user walks to a car door and scans a mobile phone, an activated NFC car key "CarKeyId0" triggers the car door of the car a to unlock. The user can enter the car.

It may be learned from SS1 to S55 that an NFC card is automatically activated based on the Bluetooth connection event. Compared with geo-fence information, Bluetooth of a device is unique, so that a requirement of using the Bluetooth in multiple different places can be met. For example, no matter where the car is located, the Bluetooth identifier of the car is fixed, so that provided that a correspondence is configured, a function of automatically activating the NFC key corresponding to the Bluetooth identifier can be implemented. In addition, compared with a positioning signal, the Bluetooth signal is less susceptible to an environment, so that the Bluetooth signal can be applied to more environments, such as an underground parking lot. A mobile phone may fail to obtain a positioning signal, but provided that a distance between the mobile phone and the car is within the connection range of the Bluetooth, the mobile phone can be connected to the Bluetooth of the car, thereby implementing the function of automatically activating an NFC key corresponding to the Bluetooth identifier. It may be learned that a manner of activating an NFC card based on a Bluetooth event has a wider application range.

It may be understood that since the Bluetooth event includes a Bluetooth connection event and a Bluetooth disconnection event, it may be understood that the NFC service may detect the Bluetooth disconnection event.

The following scenario is used as an example: It is assumed that, after the user parks the car a after driving and gets off with the mobile phone. In this case, the mobile phone is still connected to the Bluetooth of the car, and the NFC car key "CarKeyId0" remains activated. After getting off the car, the user scans the mobile phone at the car door, and the NFC car key triggers the car door to lock. When the user is away from the car, if the mobile phone is beyond a connection range of the Bluetooth "CarBleId0" of the car a, the mobile phone is disconnected from the Bluetooth "CarBleId0" of the car a, so that the Bluetooth disconnection event can be detected. Therefore, S56 is performed.

S56. The NFC service determines whether the activated NFC card is an NFC car key corresponding to a Bluetooth identifier on which a Bluetooth disconnection event occurs. If not, no processing is performed or S51 is performed, and if yes, S57 is performed.

In may be understood that, after the Bluetooth connection of the car is disconnected, it indicates that the user is relatively away from the car, and it may be considered that there is no requirement of using the NFC car key. Therefore, the NFC car key does not need to remain activated, while other NFC cards can be activated.

S57. The NFC service activates the NFC card using geo-fence information or other conditions.

In some implementations, in a case that strength of a positioning signal is high and positioning information can be obtained, the NFC card can be activated using the geo-fence information. For example, the mobile phone obtains positioning information, and the positioning information indicates that a position of the mobile phone is within a geo-fence of an access control system of a residence. Therefore, the NFC card of the access control system of the residence is activated.

In some other implementations, positioning information may not be obtained, so that the NFC card may be activated according to other conditions. Specifically, an NFC card may be pre-specified. In a case that positioning information is not obtained, the specified NFC card is activated. For example, the pre-specified NFC card is an NFC garage key.

It may be learned from S56 to S57 that the activated NFC card can be switched based on the Bluetooth disconnection event, thereby further improving the application range.

In conclusion, in an NFC card activation procedure according to this embodiment, the NFC card is automatically activated or the activated NFC card is switched based on the Bluetooth event. Compared with geo-fence information, Bluetooth of a device is unique, so that a requirement of using the Bluetooth in multiple different places can be met. For example, no matter where the car is located, the Bluetooth identifier of the car is fixed, so that provided that a correspondence is configured, a function of automatically activating the NFC key corresponding to the Bluetooth identifier can be implemented. In addition, compared with positioning information, the Bluetooth signal is less susceptible to an environment, so that the Bluetooth signal can be applied to more environments, such as an underground parking lot. A mobile phone may fail to obtain a positioning signal, but provided that a distance between the mobile phone and the car is within the connection range of the Bluetooth, the mobile phone can be connected to the Bluetooth of the car, thereby implementing the function of automatically activating the NFC card or switching the activated NFC card and having a wider application range.

In the foregoing embodiment, description is made using the correspondence shown in table 1 as an example. In practice, it is possible that multiple correspondences between the NFC car key and the Bluetooth identifier of the car are configured in an electronic device. In addition, Bluetooth of multiple cars is connected to the electronic device.

For example, a possible scenario example is: Multiple cars are intensively parked in a same area. After the user enters the area with the mobile phone, the Bluetooth of the multiple cars is connected to the mobile phone. In this case, it is necessary to select an NFC car key of one car from the multiple cars connected to the Bluetooth of the electronic device to activate.

With reference to scenarios of the multiple cars, examples of pre-configured correspondences are shown in Table 2.

TABLE 2

| Index | NFC car key | Bluetooth of car |
|-------|-------------|------------------|
| 0     | CarKeyId0   | CarBleId0        |
| 1     | CarKeyId1   | CarBleId1        |
| ...   |             | ...              |
| n     | CarKeyIdn   | CarBleIdn        |

It may be understood that, for an example of a configuration manner of each correspondence in Table 2, reference may be made to FIG. 6a to FIG. 6d, or FIG. 7a to FIG. 7d, which is not repeated herein again.

Figure 9:
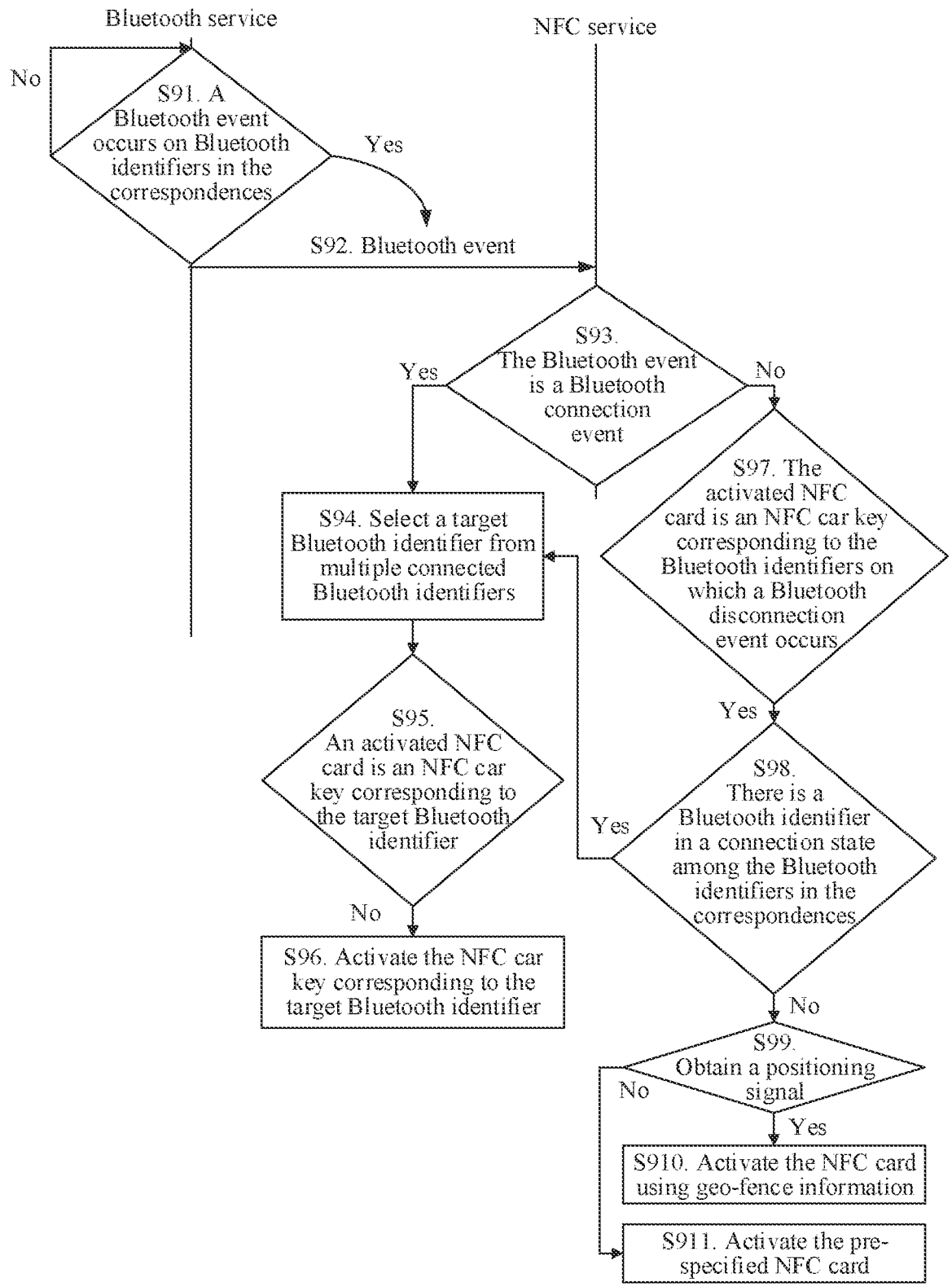
FIG. 9 is a flowchart of another NFC card activation method disclosed in an embodiment of this application.

FIG. 9 shows another NFC activation method disclosed in an embodiment of this application. A difference between an application scenario and the application scenario of the procedure shown in FIG. 5 is that multiple correspondences are pre-configured, Bluetooth identifiers included in different correspondences are different (for example, Bluetooth of different cars), and it is assumed that Bluetooth of multiple cars is connected to an electronic device.

FIG. 9 includes the following steps:

S91. A Bluetooth service determines whether a Bluetooth event occurs on Bluetooth identifiers in the correspondences. If yes, S92 is performed, and if not, no processing is performed or S91 is performed.

S92. The Bluetooth service sends the Bluetooth event to an NFC service.

For a specific implementation of S91, reference may be made to S51, and for a specific implementation of S92, reference may be made to S52, which are not repeated herein again.

S93. The NFC service determines whether the Bluetooth event is a Bluetooth connection event. If yes, S94 is performed, and if not, S97 is performed.

With reference to the foregoing scenarios, multiple cars may be connected to the mobile phone through Bluetooth. Therefore, the Bluetooth service transmits Bluetooth events of multiple Bluetooth identifiers to the NFC service. In this embodiment, it is assumed that multiple Bluetooth connection events are included in the multiple Bluetooth events. Therefore, S94 is performed.

S94. The NFC service selects an identifier from the multiple Bluetooth identifiers connected to the electronic device as a target Bluetooth identifier.

In some implementations, a Bluetooth identifier with highest Bluetooth signal strength is selected from the multiple Bluetooth identifiers as the target Bluetooth identifier.

Figure 10:
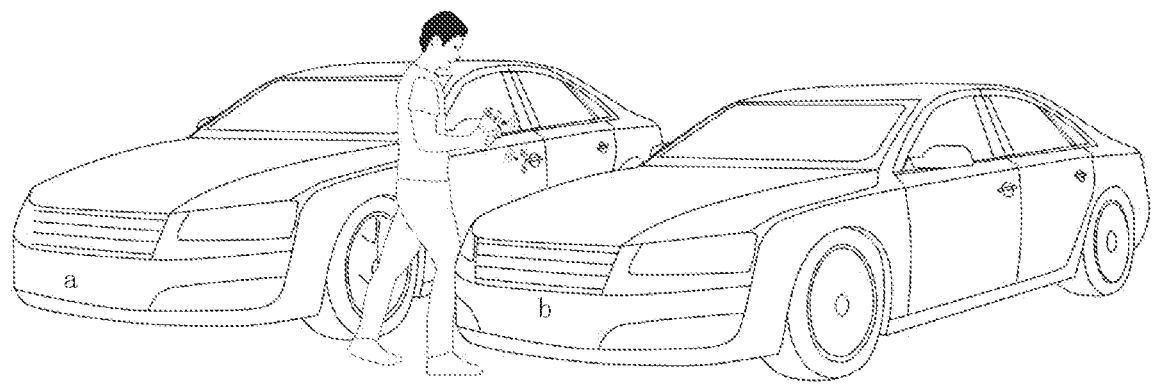
FIG. 10 is an exemplary diagram of an application scenario of an NFC card activation method disclosed in an embodiment of this application.

In some other implementations, it is possible that multiple Bluetooth signals have maximum strength. FIG. 10 is used as an example. The user may be in the middle of a car a and a car b, so that strength of Bluetooth signals of both cars is the same.

If the strength of multiple Bluetooth signals is all maximum strength, one target Bluetooth identifier is selected from multiple Bluetooth identifiers corresponding to the maximum signal strength.

In this embodiment, a selection manner is not limited: In some implementations, a Bluetooth identifier may be randomly selected as the target Bluetooth identifier from the multiple Bluetooth identifiers corresponding to the maximum signal strength. In some other implementations, a Bluetooth identifier that is connected to the Bluetooth of the electronic device first may be selected as the target Bluetooth identifier from the multiple Bluetooth identifiers corresponding to the maximum signal strength according to a sequence of connection with the electronic device. Alternatively, the target Bluetooth identifier is selected from the multiple Bluetooth identifiers corresponding to the maximum signal strength according to a sequence of the Bluetooth identifiers in a list of connected Bluetooth. For example, the first Bluetooth identifier in a list of connected Bluetooth identifiers is selected as the target Bluetooth identifier.

S95. The NFC service determines whether the activated NFC card is an NFC car key corresponding to the target Bluetooth identifier. If yes, no processing is performed or S91 is performed, and if not, S96 is performed.

S96. The NFC service activates the NFC car key corresponding to the target Bluetooth identifier.

With reference to Table 2 and FIG. 10, it is assumed that the Bluetooth of the car a, that is, the NFC car key "CarKeyId0" corresponding to the target Bluetooth identifier "CarBleId0", is activated. After the user scans the mobile phone at the car door of the car a the activated NFC car key "CarKeyId0" triggers the car door of the car a to unlock.

It may be understood that since the target Bluetooth identifier is selected from the multiple Bluetooth identifiers connected to the electronic device, to improve the user experience, after S96, prompt information that the NFC car key corresponding to the target Bluetooth identifier is activated may alternatively be displayed. A form and content of the prompt information are not limited. In the example above, the NFC car key "CarKeyId0" corresponding to the target Bluetooth identifier "CarBleId0" is activated, and a currently activated NFC car key displayed on a screen of the mobile phone is "CarKeyId0", so that the user can scan the mobile phone at the car door of the car a according to the prompt information to trigger the car door of the car a to unlock. It may be understood that the user may alternatively switch the activated NFC car key according to the prompt information.

Similar to the foregoing embodiment, if the mobile phone is beyond the connection range of the Bluetooth "CarBleId0" of the car a, the mobile phone is disconnected from the Bluetooth "CarBleId0" of the car a. Since the Bluetooth disconnection event is detected, S97 is performed.

S97. The NFC service determines whether the activated NFC card is the NFC car key corresponding to the Bluetooth identifier for disconnecting the Bluetooth connection. If not, no processing is performed or S91 is performed, and if yes, S98 is performed.

S98. The NFC service determines whether there is still a Bluetooth identifier that is in a connection state of the Bluetooth identifiers of the correspondences. If yes, S94 and subsequent corresponding steps are performed, and if not, S99 is performed.

In some implementations, the NFC service may invoke the Bluetooth service to obtain the Bluetooth identifier that is in the connected state.

S99. The NFC service determines whether a positioning signal is obtained. If yes, S910 is performed, and if not, S911 is performed.

S910. The NFC service activates the NFC card using geo-fence information.

S911. The NFC service activates the pre-specified NFC card.

In the procedure shown in FIG. 9, the NFC car key is activated based on strength of a Bluetooth signal. Therefore, in a case that the electronic device is connected to Bluetooth of multiple cars, there is also a possibility that the electronic device automatically activates the NFC car key expected by the user, which further expands an application range of automatically activating the NFC card.

In practice, NFC cards associated with a car may include other NFC cards than the NFC car key. One possible scenario is: The car is parked in a parking space near a residence, and a key of the residence has been pre-configured with an NFC residence key. Therefore, the NFC residence key is related to the car. Another possible scenario is: The car is parked in a garage, and a key of the garage is pre-configured with an NFC garage key. Therefore, the NFC garage key is related to the car.

For this scenario, in the following embodiments, other NFC cards are added to the pre-configured correspondences, and further, if the other NFC cards have fixed positions, a geo-fence may also be configured for the other NFC cards.

As shown in Table 3, in this embodiment, Description is made using an example that the other NFC cards are NFC residence keys or NFC garage keys, but the other NFC cards are not limited to thereto, and may alternatively be other NFC access cards or non-access cards, which is not limited herein. The NFC residence keys and the NFC garage keys in Table 3 have pre-configured geo-fences.

TABLE 3

| Index | NFC car key | Bluetooth of car | |
|---|---|---|---|
| 0 | CarKeyId0 | CarBleId0 | NFC residence key: AccessKeyId0 |
| ... | ... | ... | ... |
| n | CarKeyIdn | CarBleIdn | NFC garage key: AccessKeyIdn |

It may be understood that a manner of configuring a geo-fence for the NFC residence key or NFC garage key may be implemented in combination with a manner of configuring a geo-fence for the NFC card in FIG. 6a to FIG. 6c, or in combination with a manner of configuring a geo-fence for the NFC card in FIG. 7a to FIG. 7c.

Figure 11:
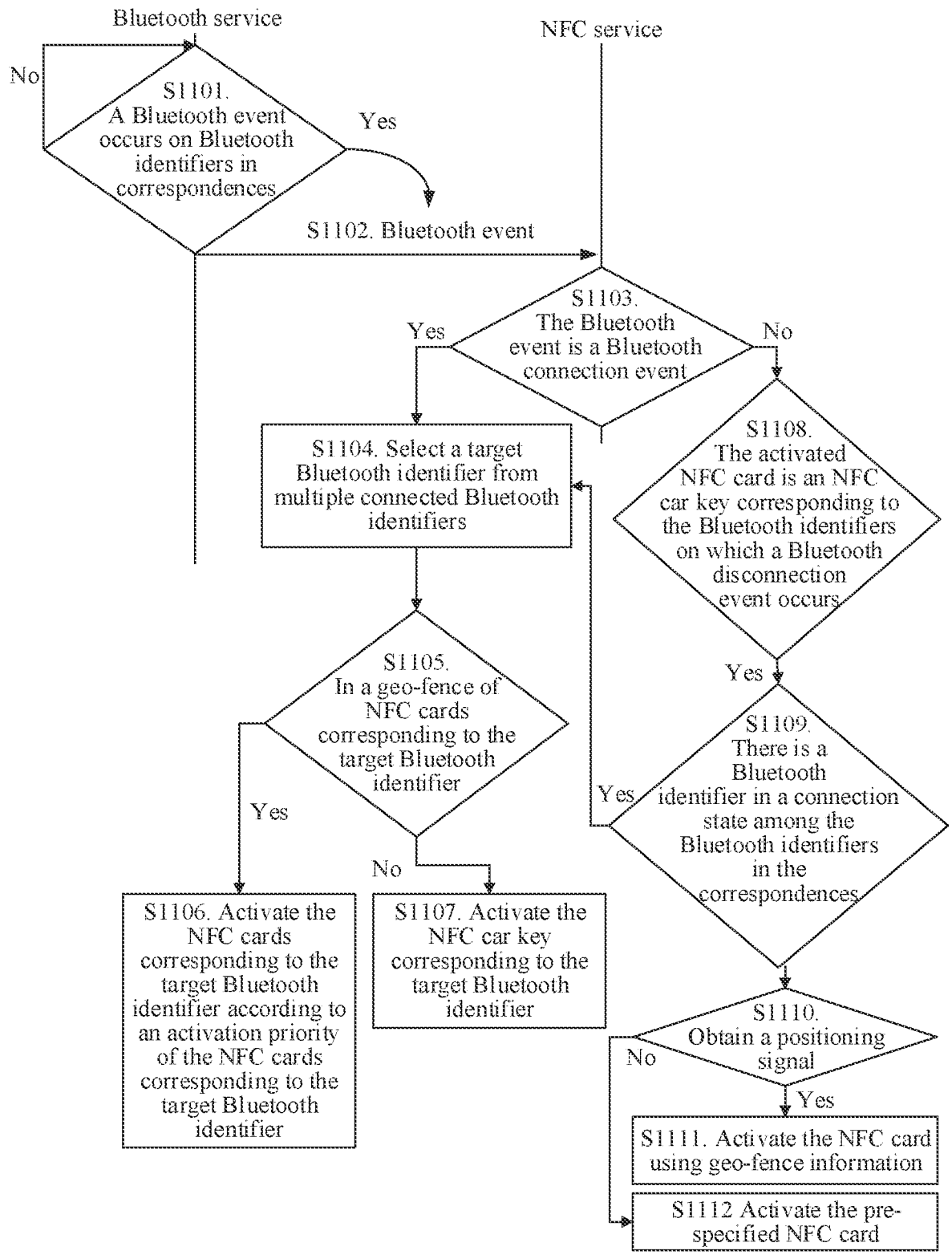
FIG. 11 is a flowchart of another NFC card activation method disclosed in an embodiment of this application.

As shown in Table 3, FIG. 11 shows another NFC card activation method disclosed in an embodiment of this application. A difference between a scenario example to which the method is applied and the scenario example to which the procedure shown in FIG. 5 is applied is that: The correspondences shown in Table 3 have been configured in a mobile phone and the mobile phone can obtain positioning information. In this case, there is a possibility that an electronic device is located in both a geo-fence and the connection range of the Bluetooth. Therefore, it is necessary to set a priority of activating the NFC card based on the geo-fence and activating the NFC card based on the Bluetooth connection.

It may be understood that a range of the geo-fence of other NFC cards may be larger than, equal to, or smaller than the connection range of the Bluetooth. The following uses an example that the range of the geo-fence of other NFC cards is larger than the connection range of the Bluetooth for description.

Figure 12:
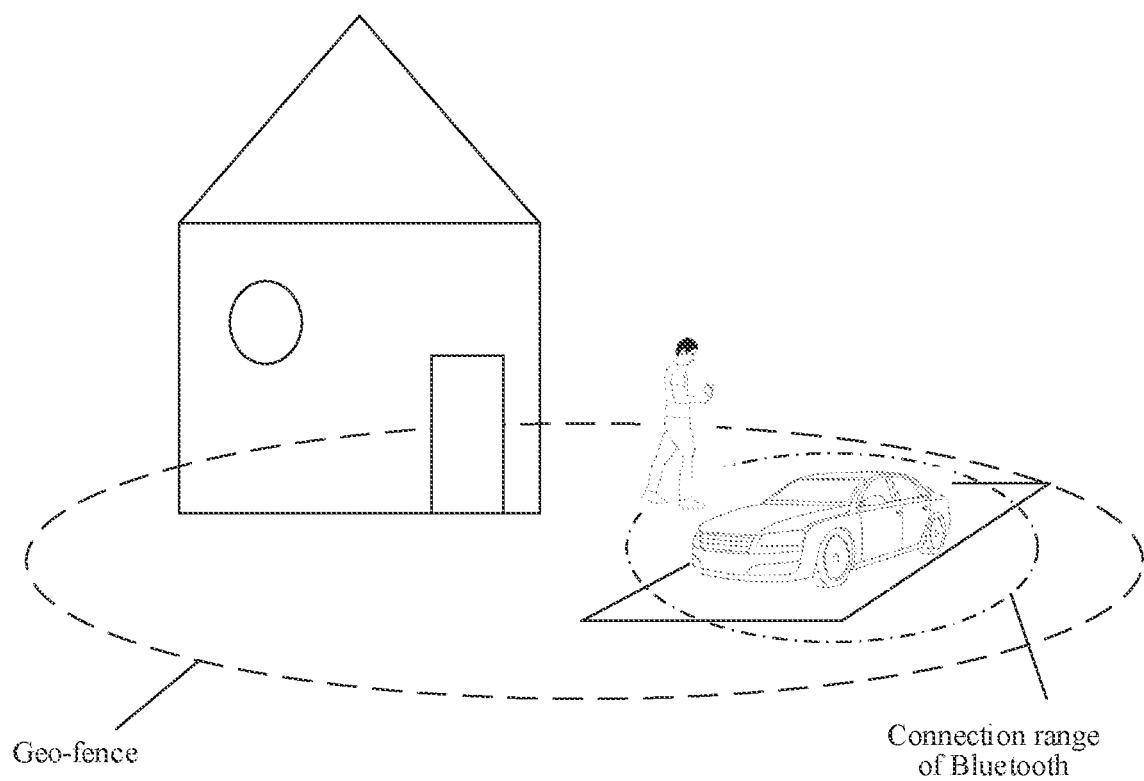
FIG. 12 is an exemplary diagram of an application scenario of an NFC card activation method disclosed in an embodiment of this application.

FIG. 12 is used as an example. A parking space is near a residence, and a user parks a car a in a parking space. It is assumed that a correspondence among a pre-configured Bluetooth identifier of the car a, an NFC car key of the car a, and an NFC residence key is the correspondence whose number is 0 in Table 3.

When the user carries a mobile phone, since a range of a geo-fence of the NFC residence key is larger than a connection range of Bluetooth, the user is always located in the geo-fence of the NFC residence key when carrying the mobile phone to approach the car a, and after the mobile phone enters the connection range of the Bluetooth of the car a, the mobile phone is connected to the Bluetooth of the car a again. Therefore, during a movement of the user from the residence to the car a to expect to unlock a car door, the mobile phone performs S1101 to S1109.

Figure 13A:
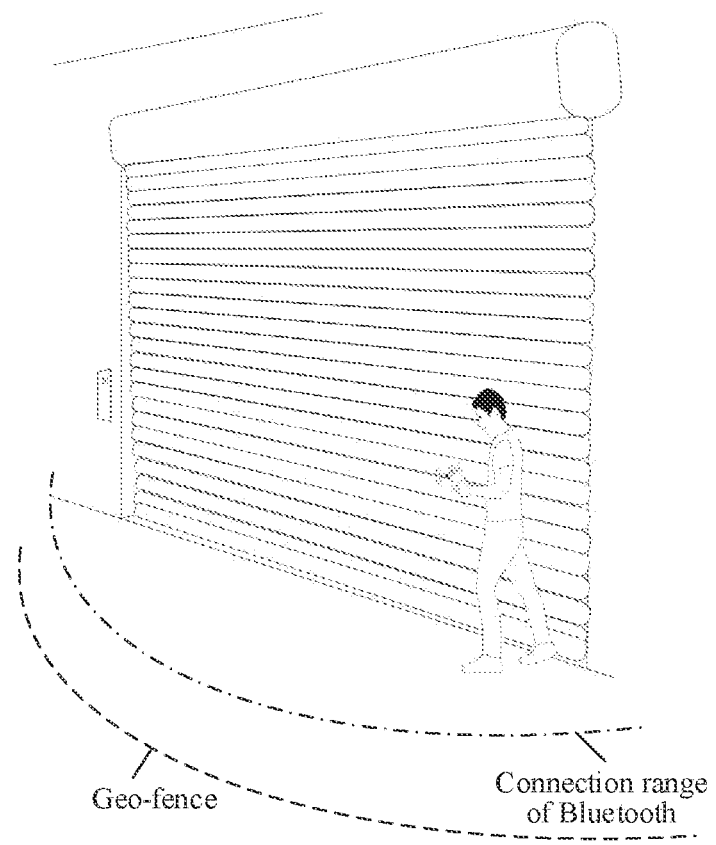
FIG. 13a to FIG. 13c are exemplary diagrams of application scenarios of an NFC card activation method disclosed in an embodiment of this application.

FIG. 13a is used as an example. A car b is parked in a garage, and it is assumed that a correspondence among a pre-configured Bluetooth identifier of the car b, an NFC car key, and an NFC garage key is the correspondence whose number is n in Table 3.

When the user carries the mobile phone, moves to the car b, and unlocks a car door, since a range of a geo-fence of the NFC garage key is larger than a connection range of Bluetooth, when the user carries the mobile phone and approaches the car b, the user first enters the geo-fence of the NFC garage key, and the mobile phone is then connected to the Bluetooth of the car b. Therefore, in this process, when the mobile phone is not connected to the Bluetooth of the car b, the mobile phone activates the NFC garage key based on an electronic fence, which is not repeated herein again. The mobile phone performs S1101 to S1109.

S1101. A Bluetooth service determines whether a Bluetooth event occurs on Bluetooth identifiers in the correspondences. If yes, S1102 is performed, and if not, no processing is performed or S1101 is performed.

S1102. The Bluetooth service sends the Bluetooth event to an NFC service. For a specific implementation of S1101, reference may be made to S51, and for a specific implementation of S1102, reference may be made to S52, which are not repeated herein again.

S1103. The NFC service determines whether the Bluetooth event is a Bluetooth connection event. If yes, S1104 is performed, and if not, S1108 and subsequent steps are performed, which is not repeated herein again.

S1104. The NFC service selects a target Bluetooth identifier from the Bluetooth identifiers on which the Bluetooth connection event occurs.

In some implementations, the NFC service receives Bluetooth connection events of multiple Bluetooth identifiers, and selects one Bluetooth identifier from the multiple Bluetooth identifiers as the target Bluetooth identifier. For details, reference may be made to S94.

S1105. The NFC service determines whether the user is in the geo-fence of NFC cards corresponding to the target Bluetooth identifier. If yes, S1106 is performed, and if not, S1107 is performed.

With reference to FIG. 12, assuming that the target Bluetooth identifier is "CarBleId0", other NFC cards are "NFC residence key: AccessKeyId0". With reference to FIG. 13a, assuming that the target Bluetooth identifier is "CarBleIdn", other NFC cards are "NFC residence key: AccessKeyIdn".

With reference to the foregoing scenario examples, in FIG. 12 and FIG. 13a, since the geo-fences are all larger than the Bluetooth connection range, the electronic device is already in the geo-fences of the other NFC cards when the Bluetooth connection events are detected.

S1106. The NFC service activates the NFC cards corresponding to the target Bluetooth identifier according to an activation priority of the NFC cards corresponding to the target Bluetooth identifier.

The activation priority indicates a priority of activation bases of the NFC cards, that is, whether a Bluetooth connection is activated first or a geo-fence is activated first. The correspondence whose number is 0 in Table 3 is used as an example. If the activation priority is Bluetooth connection activation first, the NFC car key "CarBleId0" is then activated first, and if the activation priority is geo-fence activation first, the NFC residence key "AccessKeyId0" is then activated first.

It may be understood that the activation priority may be pre-configured for each correspondence by the user, that is, a configuration step of configuring the activation priority is added in a process of configuring the correspondences by the user.

With reference to FIG. 12, since the parking space is located near the residence, it is possible that the user is always in the geo-fence of the NFC residence key from leaving the residence to entering the car. Therefore, the user can configure the activation priority of the correspondence whose number is 0 in Table 3 as a Bluetooth priority. Therefore, when the user carries the mobile phone to approach the car a, in a case that the mobile phone is not connected to the Bluetooth of the car a, since the user is in the geo-fence of the NFC residence key, the NFC residence key is in an activated state. After the user enters the connection range of the Bluetooth of the car a and the mobile phone is connected to the Bluetooth of the car a, though the user is still in the geo-fence of the NFC residence key, according to a Bluetooth priority rule, the NFC car key of the car a is activated, that is, the activated NFC card is switched from the NFC residence key to the NFC car key. After the NFC car key is used, if the user is still within the geo-fence of the NFC residence Key, the NFC residence Key is activated.

It may be understood that the activation priorities of different correspondences may be the same or different.

With reference to FIG. 13a, since the car b is parked in the garage and a garage access control system is configured with an NFC garage key, the NFC garage key needs to be activated first and the NFC car key is then activated. Therefore, the user can configure the activation priority of the correspondence whose number is n in Table 3 as a geo-fence priority. Therefore, when the user carries the mobile phone to approach the car b, in a case that the mobile phone is not connected to the Bluetooth of the car b, if the user enters the geo-fence of the NFC garage key, the mobile phone activates the NFC garage key. After the user enters the connection range of the Bluetooth of the car b and the mobile phone is connected to the Bluetooth of the car b, and the NFC garage key "AccessKeyIdn" remains activated according to a geo-fence priority rule. After the NFC garage key "AccessKeyIdn" is used, the NFC car key "CarKeyIdn" corresponding to the target Bluetooth is activated.

The NFC card being used means that the NFC card generates data interaction, so that whether the NFC garage key is used can be determined based on whether the NFC garage key generates data interaction after being activated.

Figure 13B:
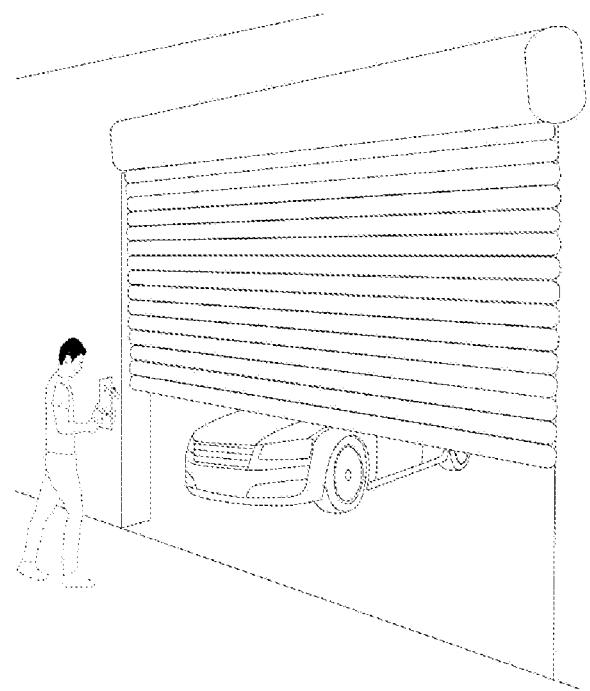
Figure 13C:
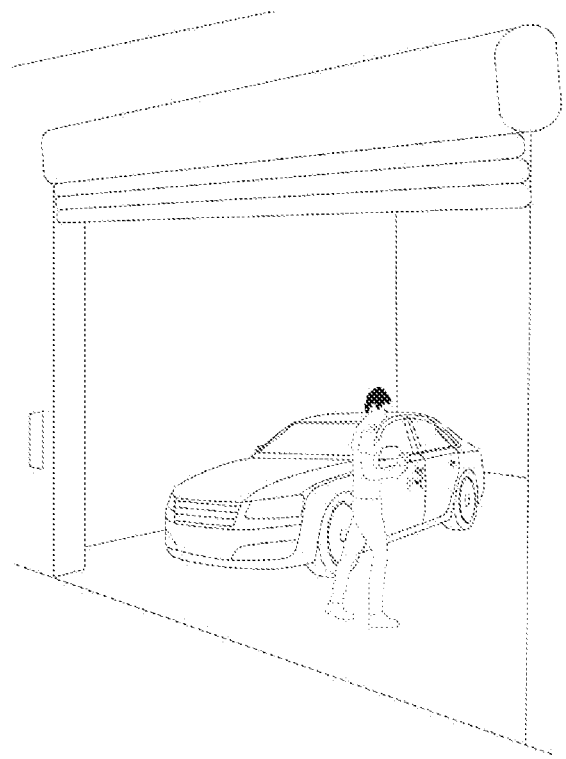

With reference to FIG. 13b, when "AccessKeyIdn" is activated and after the user scans the mobile phone at the garage access control system, the garage door is opened. Therefore, the NFC garage key "AccessKeyIdn" is used, so that the NFC car key "CarKeyIdn" is activated. As shown in FIG. 13c, the user enters the garage and uses "CarKeyIdn" to unlock the car door.

It may be understood that in addition to pre-configuring the activation priority of the correspondences by the user, the activation priority may alternatively be configured for the correspondences in combination with collected data.

The car parked in the garage configured with an NFC garage key is stilled used as an example. In a scenario that the user drives out of the garage, activating the NFC garage key first and then activating the NFC car key meet a requirement, as shown in FIG. 13*a* to FIG. 13*a*. However, in a scenario that the user parks the car in the garage, after the user gets off, the mobile phone is still connected to the Bluetooth of the car a, but it is necessary to lock the car door first and then lock a garage door. It may be learned that a fixed activation priority pre-configured by the user cannot meet a requirement.

Therefore, a scenario can be determined through the data collected in the mobile phone, such as exiting the garage or entering the garage, and then the activation priority can be configured based on the scenario.

In some implementations, navigation data is collected and used to determine the scenario. For example, if the navigation data indicates that a start point of a route is the garage, the scenario is exiting the garage, and if the navigation data indicates that an end point of the route is the garage, the scenario is entering the garage. If the scenario is exiting the garage, the activation priority is determined to be a geo-fence priority, and if the scenario is entering the garage, the activation priority is determined to be a Bluetooth priority.

For example, the user gets off the car with the mobile phone after parking the car in the garage. In this case, the mobile phone is connected to the Bluetooth of the car b, and the mobile phone determines that the scenario is entering the garage based on the navigation data, so that the activation priority is the Bluetooth priority, and the NFC car key is activated. After the user scans the card in the car b and locks the car, and the mobile phone detects that the NFC car key has been used, the NFC garage key is activated. After the user scans the mobile phone at the garage access control system, the garage door is locked.

It may be understood that the data includes but is not limited to navigation data, search data, and other data running and generated in the electronic device.

S1107. The NFC service activates the NFC car key corresponding to the target Bluetooth identifier.

S1108. The NFC service determines whether the activated NFC card is the NFC car key corresponding to the Bluetooth identifier that disconnects the Bluetooth connection. If not, no processing is performed or S1101 is performed, and if yes, S1109 is performed.

S1109. The NFC service determines whether there is a Bluetooth identifier in a connection state among the Bluetooth identifiers of the correspondences. If yes, S1104 and subsequent corresponding steps are performed, and if not, S1110 is performed.

S1110. The NFC service determines whether a positioning signal is obtained. If yes, S1111 is performed, and if not, S1112 is performed.

S1111. The NFC service activates the NFC card using the geo-fence information.

S1112. The NFC service activates the pre-specified NFC card.

It may be learned from FIG. 11 that, a combination of a geo-fence and a Bluetooth event to implement activation of the NFC card has a wider application range, thereby providing a user with a wider usage scenario.

Figure 14:
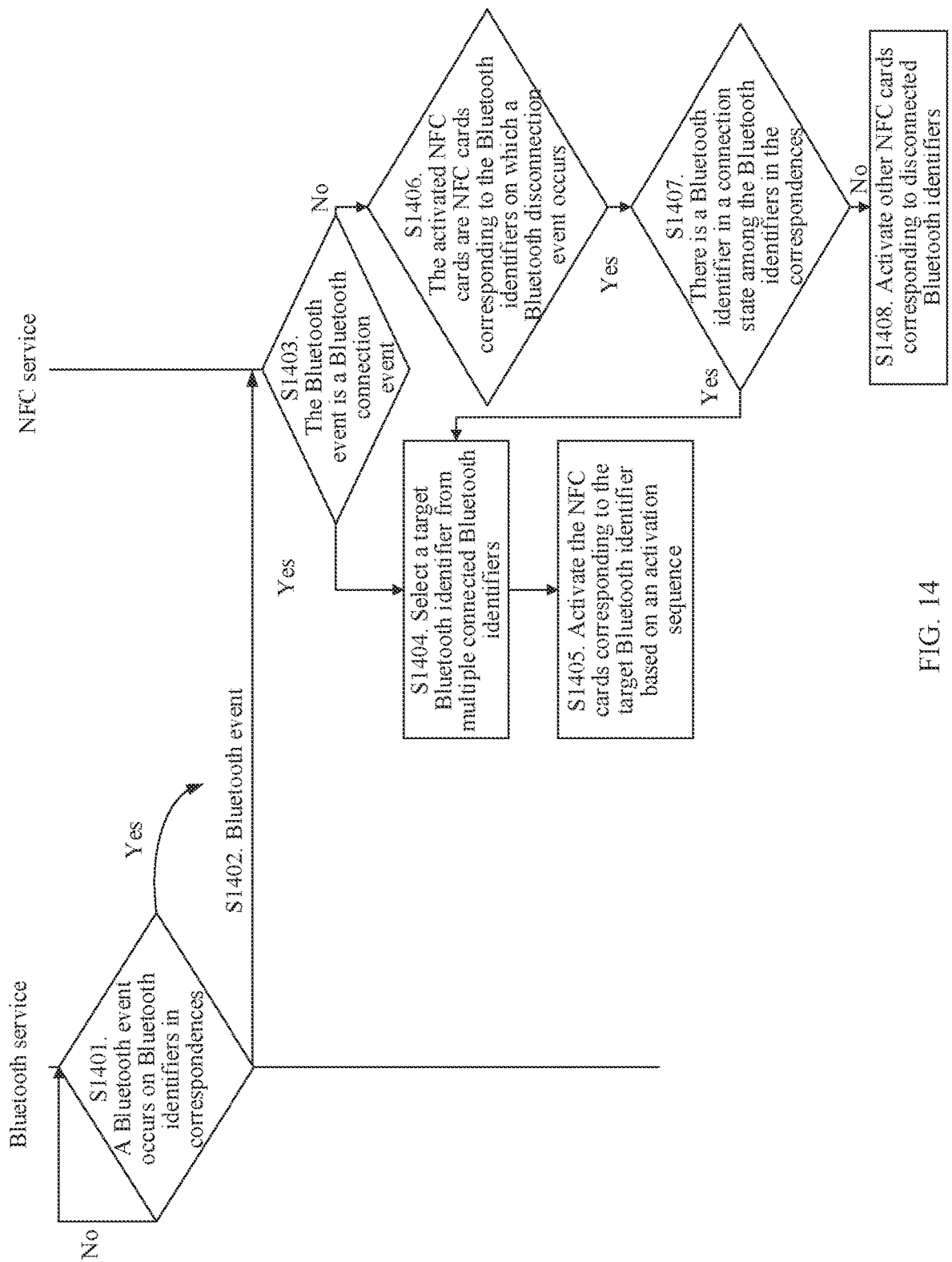
FIG. 14 is a flowchart of another NFC card activation method disclosed in an embodiment of this application.

It may be understood that a premise of the procedure shown in FIG. 11 is that the electronic device can obtain positioning information, but in practice, the electronic device may fail to obtain the positioning information, for example, a garage or parking space is located in an area with a weak positioning signal such as underground. Therefore, FIG. 14 shows another NFC card activation method disclosed in an embodiment of this application. In this embodiment, an electronic device cannot obtain a positioning signal, and examples of pre-configured correspondences are also shown in Table 3. However, a difference is that NFC cards in the correspondences in Table 3 are no longer configured with a geo-fence priority or an activation priority, but are pre-configured with an activation sequence.

FIG. 14 includes the following steps:

S1401. A Bluetooth service determines whether a Bluetooth event occurs on Bluetooth identifiers in the correspondences. If yes, S1402 is performed, and if not, no processing is performed or S1401 is performed.

S1402. The Bluetooth service sends the Bluetooth event to an NFC service.

For a specific implementation of S1401, reference may be made to S51, and for a specific implementation of S1402, reference may be made to S52, which are not repeated herein again.

S1403. The NFC service determines whether the Bluetooth event is a Bluetooth connection event. If yes, S1404 is performed, and if not, S1406 is performed.

S1404. The NFC service selects a target Bluetooth identifier from the Bluetooth identifiers on which the Bluetooth connection event occurs.

For a specific implementation, reference may be made to S1104.

S1405. The NFC service sequentially activates NFC cards corresponding to the target Bluetooth identifier according to an activation sequence of the NFC cards corresponding to the target Bluetooth identifier.

The activation sequence refers to a sequence in which the NFC cards are activated sequentially.

Activating sequentially according to the activation sequence means that the NFC cards are activated from first to last according to the activation sequence, and after a previous NFC card is used, a next NFC card is activated.

The activation sequence may be pre-configured. For example, in the correspondence whose number is 0 in Table 3, the activation sequence of the NFC cards is pre-configured as "AccessKeyId0" and "CarBleId0".

The activation sequence may also be determined in combination with collected data, that is, the activation sequence is configured for the correspondences in combination with the collected data.

For example, a user carries a mobile phone to approach a car a parked in an underground garage and the mobile phone is connected to Bluetooth of the car a. In this case, according to the activation sequence corresponding to the correspondences, an NFC garage key "AccessKeyId0" is activated first, and an NFC car key "CarBleId0" is then activated after "AccessKeyId0" is used.

In another example, after the user gets off the car with the mobile phone, the mobile phone estimates that a scenario is entering the garage according to the collected data, so that when the mobile phone is connected to the Bluetooth of the car a, the NFC car key is activated first, and the NFC garage key is then activated after the NFC car key is used.

S1406. After receiving a Bluetooth disconnection event, the NFC service determines whether the activated NFC cards are NFC car keys corresponding to the Bluetooth identifiers on which the Bluetooth disconnection event occurs. If yes, no processing is performed, and if yes, S1407 is performed.

S1407. The NFC service determines whether there is a Bluetooth identifier in a connection state among the Bluetooth identifiers of the correspondences. If yes, S1404 is performed, and if not, S1408 is performed.

Since a positioning signal cannot be obtained, the NFC card cannot be activated based on the geo-fence after the Bluetooth is disconnected. In this embodiment, S1408 may be performed.

S1408. The NFC service activates other NFC cards corresponding to the disconnected Bluetooth identifiers.

As shown in Table 3, since the other NFC cards are associated with the car, it is very likely that the other NFC cards need to be used after the user gets off. Therefore, even though positioning information cannot be obtained, NFC cards that users may use can be activated, which further expands an application scenario of activating NFC cards.

For example, the parking space is an underground parking space near a residence, and the user has pre-configured the correspondence whose number is 0 in Table 3. After the user parks at the parking space and gets off, the mobile phone remains connected to the Bluetooth of the car. The NFC car key is activated, and the user can scan the mobile phone at the car door to lock the car door. When the user carries the mobile phone from the parking space to the residence, with an increase of a distance from the car, the mobile phone is disconnected from the Bluetooth of the car. However, since the user is in an underground parking lot or the user takes an elevator, it is impossible to activate the NFC residence key using the geo-fence. According to S1408, the NFC residence key corresponding to the Bluetooth identifier of the car is activated, and the user can unlock a door lock of the residence using the mobile phone, thereby resolving a problem that the NFC card cannot be activated due to a poor positioning signal.

It may be understood that it is possible that a car is associated with multiple other NFC cards (NFC cards other than NFC car keys). For example, both the residence and a company have a garage, and the garages are configured with NFC garage keys.

In this case, one implementation is that one another NFC card is included in a correspondence, and different other NFC cards associated with the same car are written in different correspondences.

For example, as shown in Table 4:

TABLE 4

| Index | NFC car key | Bluetooth of car | NFC garage key |
|---|---|---|---|
| 0 | CarKeyId0 | CarBleId0 | AccessKeyId0 |
| 1 | CarKeyId0 | CarBleId0 | AccessKeyId1 |

It may be learned from Table 4 that, the Bluetooth identifier "CarBleId0" and the NFC car key "CarKeyId0" of the same car correspond to multiple other NFC cards: "AccessKeyId0" and "AccessKeyId1". It is assumed that "AccessKeyId0" is the NFC garage key of the residence and "AccessKeyId1" is the NFC garage key of the company.

Figure 15:
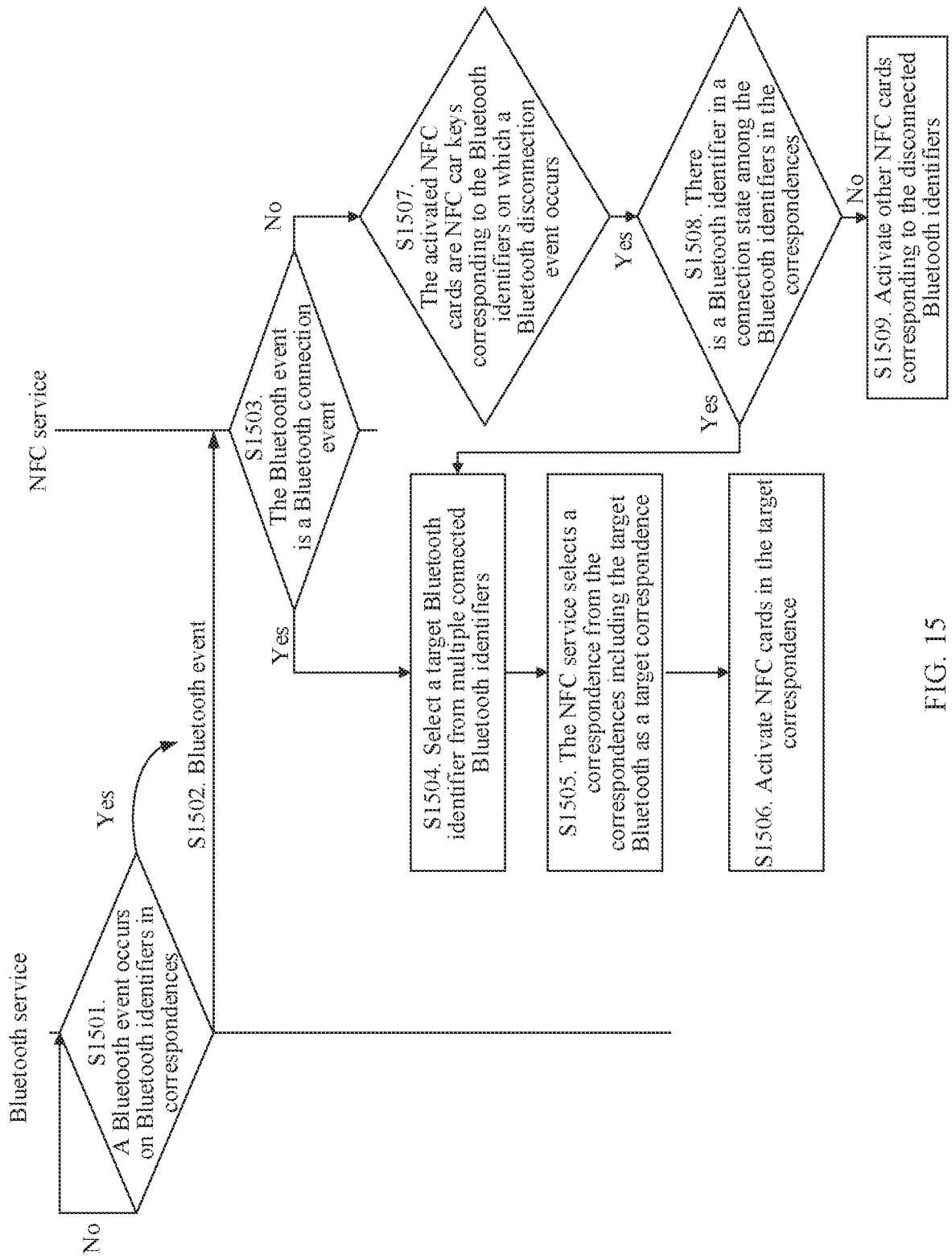
FIG. 15 is a flowchart of another NFC card activation method disclosed in an embodiment of this application.

FIG. 15 shows another NFC card activation method disclosed in an embodiment of this application. With reference to Table 4, it is possible to select a correspondence from multiple correspondences corresponding to target Bluetooth and activate an NFC card based on the selected correspondence.

FIG. 15 includes the following steps:

S1501. A Bluetooth service determines whether a Bluetooth event occurs on Bluetooth identifiers in the correspondences. If yes, S1502 is performed, and if not, no processing is performed or S1501 is performed.

S1502. The Bluetooth service sends the Bluetooth event to an NFC service.

For a specific implementation of S1501, reference may be made to S1401, and for a specific implementation of S1502, reference may be made to S1402.

S1503. The NFC service determines whether the Bluetooth event is a Bluetooth connection event. If yes, S1504 is performed, and if not, the Bluetooth event can be referenced as a branch step of a Bluetooth disconnection event. In FIG. 15, S1507 and subsequent procedures are used as examples.

S1504. The NFC service selects a target Bluetooth identifier from the Bluetooth identifiers on which the Bluetooth connection events occur.

S1505. The NFC service selects a correspondence from the correspondences including the target Bluetooth identifier as a target correspondence.

It may be learned from Table 4 that in the correspondences including the target Bluetooth identifier, the target Bluetooth identifier and the NFC car key are the same, but other NFC cards are different. Therefore, a basis for selecting a correspondence is other NFC cards. It may be understood that a correspondence can be selected based on a difference of the other NFC cards.

For the example in Table 4, the difference of NFC garage keys includes different positions, so that a position of an electronic device can be predicted and a correspondence can be selected based on the position.

In some implementations, the position of the electronic device is predicted using data in the electronic device. The data includes, but is not limited to: navigation data, search data, time data and other data running in the electronic device.

The navigation data may be data provided by a navigation APP, including but not limited to route data, position data of a certain destination, and the like. The search data may be search keywords provided by a search engine, and route data and position data in search results obtained based on the search keywords.

In an implementation, a destination where a car may be parked is predicted based on the navigation data. In combination with the foregoing examples, if the navigation data indicates that an end point of a route is a company, the car is predicted to be parked in a garage of the company. Therefore, a correspondence whose number is 1 in Table 4 is selected as the target correspondence. If the foregoing data predicts that the user is on a way from work, the car may be parked in a garage of a residence, and a correspondence whose number is 0 in Table 4 is selected as the target correspondence.

It may be understood that the implementation of selecting the target correspondence based on the data is only an example and is not limited.

S1506. The NFC service activates NFC cards in the target correspondence.

It may be understood that for a manner of activating an NFC card, reference may be made to S1106 or S1405.

S1507. After receiving the Bluetooth disconnection event, the NFC service determines whether the activated NFC cards are NFC car keys corresponding to the Bluetooth identifiers on which the Bluetooth disconnection event occurs. If not, no processing is performed, and if yes, S1508 is performed.

S1508. The NFC service determines whether there is a Bluetooth identifier in a connection state among the Bluetooth identifiers of the correspondences. If yes, S1504 is performed, and if not, S1509 is performed.

Since a positioning signal cannot be obtained, the NFC card cannot be activated based on the geo-fence after the Bluetooth is disconnected. In this embodiment, S1509 may be performed.

S1509. The NFC service activates other NFC cards corresponding to the disconnected Bluetooth identifiers.

The procedure shown in FIG. 15 further expands an application range of NFC cards.

What is claimed is:

1. An NFC card activation method, applied to a first electronic device, wherein a Bluetooth function is enabled in the first electronic device, and the method comprises:
   - detecting that a Bluetooth connection event occurs between Bluetooth identifiers of a second electronic device and the first electronic device;
   - selecting a target Bluetooth identifier from the Bluetooth identifiers based on Bluetooth signal strength of the second electronic device; and
   - activating NFC cards corresponding to the target Bluetooth identifier.

2. The method according to claim 1, wherein after the activating NFC cards corresponding to the target Bluetooth identifier, the method further comprises:
   - displaying the activated NFC cards.

3. The method according to claim 1, wherein the NFC cards corresponding to the target Bluetooth identifier comprise:
   - a first NFC card and a second NFC card, wherein the first NFC card is used for the second electronic device, and the second NFC card is used for an associated apparatus of the second electronic device.

4. The method according to claim 3, wherein the activating NFC cards corresponding to the target Bluetooth identifier comprises:
   - activating the first NFC card.

5. The method according to claim 4, wherein an activation basis of the first NFC card is the Bluetooth connection event, and an activation basis of the second NFC card is a geo-fence; and
   - the activating NFC cards corresponding to the target Bluetooth identifier comprises:
   - activating the NFC cards corresponding to the target Bluetooth identifier based on an activation priority in response to the first electronic device being in the geo-fence of the second NFC card, wherein the activation priority indicates a priority of the activation bases.

6. The method according to claim 5, wherein the activation priority is configured based on data in the first electronic device.

7. The method according to claim 3, wherein the activating NFC cards corresponding to the target Bluetooth identifier comprises:
   - activating the NFC cards corresponding to the target Bluetooth identifier based on an activation sequence.

8. The method according to claim 1, wherein the target Bluetooth identifier belongs to multiple correspondences, wherein each of the multiple correspondences comprises a correspondence among the target Bluetooth identifier, a first NFC card, and other NFC cards;
   - the other NFC cards in different correspondences are different, the first NFC card is used for the second electronic device, and the other NFC cards are used for an associated apparatus of the second electronic device; and
   - the activating NFC cards corresponding to the target Bluetooth identifier comprises:
   - activating the NFC cards corresponding to the target Bluetooth identifier in a target correspondence, wherein the target correspondence is a correspondence selected from the multiple correspondences.

9. The method according to claim 1, further comprising:
   - detecting that a Bluetooth disconnection event occurs between the Bluetooth identifiers of the second electronic device and the first electronic device;
   - activating NFC cards in response to a first condition, wherein the first condition comprises: the activated NFC cards are NFC cards corresponding to the Bluetooth identifiers on which the Bluetooth disconnection event occurs, wherein the first condition further comprises:
   - there is no Bluetooth identifier that is connected to the first electronic device in pre-configured Bluetooth identifiers.

10. The method according to claim 1, wherein a configuration method of the Bluetooth identifiers of the second electronic device and the corresponding NFC cards comprises:
    - configuring the Bluetooth identifiers for the NFC cards based on a display interface of the NFC cards; or
    - configuring the NFC cards for the Bluetooth identifiers based on a display interface of the Bluetooth identifiers.

11. A first electronic device, comprising;
    a processor and a memory, wherein
    the memory is configured to store an application, and the processor is configured to run the application to implement the following steps:
    - detecting that a Bluetooth connection event occurs between Bluetooth identifiers of a second electronic device and the first electronic device;
    - selecting a target Bluetooth identifier from the Bluetooth identifiers based on Bluetooth signal strength of the second electronic device; and
    - activating NFC cards corresponding to the target Bluetooth identifier.

12. The first electronic device according to claim 11, wherein after the activating NFC cards corresponding to the target Bluetooth identifier, the steps further comprise:
    - displaying the activated NFC cards.

13. The first electronic device according to claim 11, wherein the NFC cards corresponding to the target Bluetooth identifier comprise:
    - a first NFC card and a second NFC card, wherein the first NFC card is used for the second electronic device, and the second NFC card is used for an associated apparatus of the second electronic device.

14. The first electronic device according to claim 13, wherein the activating NFC cards corresponding to the target Bluetooth identifier comprises:
    - activating the first NFC card.

15. The first electronic device according to claim 14, wherein an activation basis of the first NFC card is the Bluetooth connection event, and an activation basis of the second NFC card is a geo-fence; and
    - the activating NFC cards corresponding to the target Bluetooth identifier comprises:
    - activating the NFC cards corresponding to the target Bluetooth identifier based on an activation priority in response to the first electronic device being in the geo-fence of the second NFC card, wherein the activation priority indicates a priority of the activation bases.

16. The first electronic device according to claim 15, wherein the activation priority is configured based on data in the first electronic device.

17. The first electronic device according to claim 13, wherein the activating NFC cards corresponding to the target Bluetooth identifier comprises:
   activating the NFC cards corresponding to the target Bluetooth identifier based on an activation sequence.

18. The first electronic device according to claim 11, wherein the target Bluetooth identifier belongs to multiple correspondences, wherein each of the multiple correspondences comprises a correspondence among the target Bluetooth identifier, a first NFC card, and other NFC cards;
   the other NFC cards in different correspondences are different, the first NFC card is used for the second electronic device, and the other NFC cards are used for an associated apparatus of the second electronic device; and
   the activating NFC cards corresponding to the target Bluetooth identifier comprises:
   activating the NFC cards corresponding to the target Bluetooth identifier in a target correspondence, wherein the target correspondence is a correspondence selected from the multiple correspondences.

19. The first electronic device according to claim 11, further comprising:
   detecting that a Bluetooth disconnection event occurs between the Bluetooth identifiers of the second electronic device and the first electronic device;
   activating NFC cards in response to a first condition, wherein the first condition comprises:
   the activated NFC cards are NFC cards corresponding to the Bluetooth identifiers on which the Bluetooth disconnection event occurs;
   wherein the first condition further comprises:
   there is no Bluetooth identifier that is connected to the first electronic device in pre-configured Bluetooth identifiers.

20. The first electronic device according to claim 11, wherein a configuration method of the Bluetooth identifiers of the second electronic device and the corresponding NFC cards comprises:
   configuring the Bluetooth identifiers for the NFC cards based on a display interface of the NFC cards; or
   configuring the NFC cards for the Bluetooth identifiers based on a display interface of the Bluetooth identifiers.

* * * * *